United States Patent
Yan et al.

(10) Patent No.: US 12,160,728 B2
(45) Date of Patent: Dec. 3, 2024

(54) HANDOVER METHOD, COMMUNICATIONS APPARATUS, AND TERMINAL DEVICE

(71) Applicant: HUAWEI TECHNOLOGIES CO., LTD., Guangdong (CN)

(72) Inventors: Le Yan, Shenzhen (CN); Tingting Geng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 388 days.

(21) Appl. No.: 17/667,405

(22) Filed: Feb. 8, 2022

(65) Prior Publication Data

US 2022/0167234 A1 May 26, 2022

Related U.S. Application Data

(63) Continuation of application No. PCT/CN2020/107410, filed on Aug. 6, 2020.

(30) Foreign Application Priority Data

Aug. 9, 2019 (CN) .......................... 201910736192.5

(51) Int. Cl.
*H04W 36/00* (2009.01)
*H04W 36/08* (2009.01)
(Continued)

(52) U.S. Cl.
CPC ... *H04W 36/0058* (2018.08); *H04W 36/0077* (2013.01); *H04W 36/00838* (2023.05);
(Continued)

(58) Field of Classification Search
CPC ....... H04W 36/00837; H04W 36/0058; H04W 36/0077; H04W 74/0833; H04W 36/304; H04W 36/362; H04W 36/08
(Continued)

(56) References Cited

U.S. PATENT DOCUMENTS

2014/0126545 A1 5/2014 Tamura et al.
2019/0223073 A1 7/2019 Chen et al.
(Continued)

FOREIGN PATENT DOCUMENTS

CN  111615156 A  9/2020
WO  2018132051 A1  7/2018
(Continued)

OTHER PUBLICATIONS

U.S. Appl. No. 62/874,815, filed Jul. 16, 2019.*
(Continued)

*Primary Examiner* — Faisal Choudhury

(57) ABSTRACT

This disclosure provides a handover method, a communications apparatus, and a terminal device. The handover method includes determining a first target cell based on first conditional handover (CHO) configuration information, where the first target cell is a cell to which the terminal device is to be handed over, and in a process of attempting to access the first target cell, when receiving second CHO configuration information, determining, based on the second CHO configuration information, whether to continue to be handed over to the first target cell.

18 Claims, 5 Drawing Sheets

300

S310: Determine a first target cell based on first conditional handover (CHO) configuration information S320: In a process of attempting to access the first target cell, if receiving second CHO configuration information, determine, based on the second CHO configuration information, whether to continue to be handed over to the first target cell

(51) Int. Cl.
   *H04W 36/30*     (2009.01)
   *H04W 36/36*     (2009.01)
   *H04W 74/08*     (2024.01)
   *H04W 74/0833*   (2024.01)

(52) U.S. Cl.
   CPC ......... *H04W 36/08* (2013.01); *H04W 36/304* (2023.05); *H04W 36/362* (2023.05); *H04W 74/0833* (2013.01)

(58) Field of Classification Search
   USPC .......................................................... 370/331
   See application file for complete search history.

(56) References Cited

U.S. PATENT DOCUMENTS

| | | | | |
|---|---|---|---|---|
| 2020/0413392 | A1* | 12/2020 | Purkayastha | H04W 36/0072 |
| 2021/0022055 | A1* | 1/2021  | Tseng       | H04L 5/0092  |
| 2022/0038976 | A1* | 2/2022  | Hwang       | H04W 36/0079 |
| 2022/0174562 | A1* | 6/2022  | Da Silva    | H04W 76/27   |
| 2022/0201561 | A1* | 6/2022  | Bin Redhwan | H04W 36/0072 |
| 2022/0255591 | A1* | 8/2022  | Park        | H04W 36/362  |

FOREIGN PATENT DOCUMENTS

| | | |
|---|---|---|
| WO | 2019096396 A1 | 5/2019 |
| WO | 2019098910 A1 | 5/2019 |

OTHER PUBLICATIONS

3GPP TSG RAN WG2 Meeting #106, R2-1906291, Further consideration on conditional handover, Intel Corporation, Reno, USA, May 13 to 17, 2019, total 5 pages.

3GPP TSG-RAN WG2 Meeting #106, R2-1906238, Conditional handover for NR, Lenovo, Motorola Mobility, Reno, USA, May 13-May 17, 2019, total 2 pages.

3GPP TSG-RAN2 Meeting #104, R2-1816931, Discussion on the conditional handover, OPPO, Spokane, USA, Nov. 12-16, 2018, total 3 pages.

MediaTek Inc., Performance Evaluation and Implication for Conditional HO. 3GPP TSG-RAN WG2 Meeting #104, Spokane, WA, USA, Nov. 12-16, 2018, R2-1816960, 7 pages.

Extended European Search Report issued in EP20853132.7, dated Jul. 11, 2022, 9 pages.

* cited by examiner

300

S310: Determine a first target cell based on first conditional handover (CHO) configuration information S320: In a process of attempting to access the first target cell, if receiving second CHO configuration information, determine, based on the second CHO configuration information, whether to continue to be handed over to the first target cell

FIG. 3

HANDOVER METHOD, COMMUNICATIONS APPARATUS, AND TERMINAL DEVICE

CROSS-REFERENCE TO RELATED APPLICATIONS

This application is a continuation of International Application No. PCT/CN2020/107410, filed on Aug. 6, 2020, which claims priority to Chinese Patent Application No. 201910736192.5, filed on Aug. 9, 2019. The disclosures of the aforementioned applications are hereby incorporated by reference in their entireties.

TECHNICAL FIELD

This disclosure relates to the communications field, and more specifically, to a handover method, a communications apparatus, and a terminal device.

BACKGROUND

In a mobile communications system, in a conventional handover procedure, mobility management of a terminal device in a connected mode is controlled by a network device. To be specific, the network device sends a handover message, to indicate, to the terminal device, a cell to which the terminal device is to be handed over and how to perform a handover. A conventional handover mechanism may include: A source network device (namely, a network device to which a source cell belongs) sends a handover message to a terminal device, to control the terminal device to be handed over from the source cell to a target cell. After receiving the handover message, the terminal device accesses the target cell based on information included in the handover message. Therefore, successfully sending the handover message is a necessary condition to ensure a successful handover in the conventional handover mechanism. However, in some mobile communications systems such as a long term evolution (long term evolution, LTE) system or a 5th generation mobile communication technology (5G)—especially in a high-frequency scenario—sending of the handover message may fail due to rapid attenuation of channel quality, rapid movement of the terminal device, obstruction of an object, long duration of measurement, long duration of handover preparation, or the like. Consequently, a handover failure is caused, and a handover success rate is decreased.

In view of the foregoing problems, a conditional handover (CHO) mechanism is provided in the conventional technology, to improve the handover success rate. To be specific, the source network device sends conditional handover (CHO) configuration information to the terminal device when quality of a source link is good. The configuration information includes a handover trigger condition configured by the network device for the terminal device and information about one or more candidate cells corresponding to the handover trigger condition. After receiving the CHO configuration information, the terminal device determines, based on the configuration information, whether each candidate cell meets the handover trigger condition, and uses, as a target cell, a candidate cell that meets the handover trigger condition, to be handed over to the target cell. In the CHO mechanism, the source network device sends the CHO configuration information to the terminal device when communication quality of the source link is good. Therefore, a success rate of sending the configuration information is ensured. Further, the terminal device selects the target cell based on the configuration information and performs a handover, so that the handover success rate can be improved.

In the CHO mechanism, usually, after determining the target cell based on the CHO configuration information, the terminal device may perform a random access procedure with the target cell. After random access succeeds, it may be considered that the terminal device is successfully handed over from a current serving cell to the target cell. However, in some cases, in a process in which the terminal device attempts to randomly access the target cell, the terminal device may further receive CHO configuration information to be sent by the network device. After the terminal device subsequently receives CHO configuration information, how to perform processing is a problem that needs to be resolved. Currently, a problem of how the terminal device performs correct processing in this case to improve conditional handover reliability is not considered in the conventional technology.

SUMMARY

This disclosure provides a handover method, a communications apparatus, and a terminal device, to improve conditional handover reliability, and ensure system performance.

According to a first aspect, a handover method performed by a terminal device is provided. The method includes determining a first target cell based on first conditional handover (CHO) configuration information, where the first target cell is a cell to which a terminal device is to be handed over, and in a process of attempting to access the first target cell, receiving second CHO configuration information and determining, based on the second CHO configuration information, whether to continue to be handed over to the first target cell. The process of attempting to access the first target cell includes at least one of a process that is initiated prior to sending a preamble to the first target cell; and/or a process of performing random access (RACH) to the first target cell.

In the technical solution provided in this embodiment of this disclosure, the terminal device determines the first target cell based on the first CHO configuration information. In the process in which the terminal device attempts to access the first target cell, if the terminal device receives the second CHO configuration information, the terminal device determines, based on the second CHO configuration information, whether to continue to access the previously determined first target cell, so that the terminal device can perform correct processing based on CHO configuration information provided in a network, to improve conditional handover reliability, and ensure system performance.

A network device may configure one or more candidate cells for the terminal device, the first target cell is included in the one or more candidate cells, and the first target cell is a cell that meets a CHO trigger condition in the one or more candidate cells.

The first CHO configuration information may include the CHO trigger condition and related information of a candidate cell. The CHO trigger condition may include a CHO trigger event type and a corresponding threshold. The CHO trigger event type includes, for example, an event A3, an event A4, an event A5, an event B1, an event B2, or another trigger event type. The related information of the candidate cell includes at least one piece of the following information: a cell identifier (for example, a cell global identifier (CGI) and/or a physical cell identifier (PCI)) of the candidate cell, frequency information (for example, an absolute frequency of a synchronization signal block (synchronization signal block, SSB), an absolute frequency position of a reference resource module, a frequency bandwidth list, a subcarrier spacing (SCS)-specific carrier list) corresponding to the candidate cell, a cell radio network temporary identifier (C-RNTI) allocated by the candidate cell to the terminal device, random access channel (RACH) resource information required for accessing the candidate cell, and the like. Optionally, the related information of the candidate cell may further include resource information (for example, a physical layer configuration parameter, a media access control (MAC) layer configuration parameter, a radio link control (RLC) layer configuration parameter, a packet data convergence protocol (PDCP) layer configuration parameter, a service data adaptation protocol (SDAP) layer configuration parameter, or a radio resource control (RRC) layer configuration parameter corresponding to the candidate cell.

For example, if a configured CHO trigger event type is the event A3 (which may also be referred to as an A3 event), and a configured corresponding threshold is a first threshold (for example, the first threshold is an offset), when cell signal quality of a candidate cell is higher than cell signal quality of a serving cell by the first threshold, the terminal device may determine that the candidate cell meets the CHO trigger condition. If a configured CHO trigger event type is the event A5 (which may also be referred to as an "A5 event"), and a configured corresponding threshold is a second threshold or a third threshold, when cell signal quality of a candidate cell is higher than the second threshold, and cell signal quality of a serving cell is lower than the third threshold, the terminal device may determine that the candidate cell meets the CHO trigger condition.

It should be understood that, the CHO trigger event type and whether the CHO trigger condition is met may be defined in another definition manner. This is not limited in this embodiment.

The network device may configure one or more candidate cells for the terminal device, and the first CHO configuration information may include CHO configuration information corresponding to each of the one or more candidate cells. The CHO configuration information corresponding to each candidate cell may include a CHO trigger condition corresponding to the candidate cell and related information corresponding to the candidate cell (for example, a cell identifier of the candidate cell, frequency information corresponding to the candidate cell, a C-RNTI allocated by the candidate cell to the terminal device, or random access channel (RACH) resource information required for accessing the candidate cell). Each of the one or more candidate cells may correspond to a same CHO trigger condition or a different CHO trigger condition. In other words, different candidate cells may correspond to a same CHO trigger condition, or may correspond to different CHO trigger conditions.

Optionally, the process of attempting to access the first target cell includes: the process before the terminal device sends the preamble to the first target cell; and/or a process after the terminal device sends the preamble to the first target cell and before the terminal device receives a random access response (RAR); and/or a process after the terminal device receives the RAR and before the terminal device sends a radio resource control (RRC) reconfiguration complete message to the first target cell; and/or a process after the terminal device sends the preamble to the first target cell and before the terminal device sends the RRC reconfiguration complete message to the first target cell. Alternatively, optionally, the process of attempting to access the first target cell includes: a process before the terminal device sends an RRC reconfiguration complete message to the first target cell. It should be understood that the process of attempting to access the first target cell may be understood as a procedure that needs to be completed, after the terminal device determines the first target cell to which the terminal device is to be handed over, by the terminal device to be handed over to the first target cell.

It should be noted that, that the terminal device determines, based on the second CHO configuration information, whether to continue to be handed over to the first target cell may alternatively be understood as follows: The terminal device determines, based on the second CHO configuration information, whether to continue to access the first target cell, or the terminal device determines, based on the second CHO configuration information, whether to continue to perform a random access process with the first target cell. When the terminal device does not need to perform the random access procedure with the first target cell after determining the first target cell, that the terminal device determines, based on the second CHO configuration information, whether to continue to be handed over to the first target cell may alternatively be understood as follows: The terminal device determines, based on the second CHO configuration information, whether to send the RRC reconfiguration complete message to the first target cell.

With reference to the first aspect, in a possible implementation, the determining, based on the second CHO configuration information, whether to continue to be handed over to the first target cell includes determining, based on the second CHO configuration information, that a CHO configuration parameter included in the second CHO and corresponding to the first target cell does not change, and determining to continue to be handed over to the first target cell.

When determining that the CHO configuration parameter corresponding to the first target cell does not change, the terminal device may consider that the first target cell still meets the CHO trigger condition, and the first target cell is still a target cell suitable for a handover of the terminal device. Therefore, the terminal device may continue to be handed over to the first target cell. A procedure in which the terminal device redetermines the target cell, re-attempts to access a target cell that meets the CHO trigger condition, or the like is avoided, so that complexity can be reduced, energy consumption of the terminal device can be reduced, the terminal device and a network device side have same understanding/behavior, conditional handover reliability is improved, and system performance is ensured.

With reference to the first aspect, in a possible implementation, if the terminal device is not successfully handed over to the first target cell, the method further includes determining, based on the second CHO configuration information alone or in combination with the first CHO configuration information, a second target cell to which the terminal device is to be handed over.

When a handover initiated by the terminal device to the first target cell fails, the terminal device may redetermine, based on CHO configuration information configured by the network device, a target cell to which the terminal device may be handed over, so that the terminal device can be handed over to a proper target cell, to ensure service continuity.

It should be understood that the second target cell is a cell that is redetermined and to which the terminal device attempts to be handed over after a handover procedure between the terminal device and the first target cell fails. The second target cell may be a cell that meets the CHO trigger condition in the candidate cell configured by the network device for the terminal device. The second target cell and the first target cell may be a same cell, or may be different cells.

With reference to the first aspect, in a possible implementation, the determining, based on the second CHO configuration information, whether to continue to be handed over to the first target cell includes when determining, based on the second CHO configuration information, that the CHO configuration parameter included in the second CHO and corresponding to the first target cell changes, determining, based on the second CHO configuration information alone or in combination with the first CHO configuration information, a third target cell to which the terminal device may be handed over.

Optionally, that the terminal device determines whether the CHO configuration parameter corresponding to the first target cell changes includes: determining whether the first target cell is removed, and/or determining whether a CHO trigger condition corresponding to the first target cell changes, and/or determining whether related information of the first target cell changes. The related information of the first target cell may include at least one of a C-RNTI allocated by the first target cell to the terminal device, a random access channel (RACH) resource required for accessing the first target cell, and resource information (for example, a physical layer configuration parameter, a media access control (MAC) layer configuration parameter, a radio link control (RLC) layer configuration parameter, a packet data convergence protocol (PDCP) layer configuration parameter, a service data adaptation protocol (SDAP) layer configuration parameter, or a radio resource control (RRC) layer configuration parameter) corresponding to the first target cell.

When the terminal device determines that the CHO configuration parameter corresponding to the first target cell changes, the first target cell may no longer be a cell suitable for the handover of the terminal device, and the terminal device may redetermine, based on changed configuration information, a target cell to which the terminal device may be handed over, to avoid handing over the terminal device to an improper cell, or avoid service interruption caused by a failure of a handover between the terminal device and the first target cell. The target cell to which the terminal device may be handed over is redetermined, to improve conditional handover reliability, improve a handover success rate, and ensure system performance.

It should be understood that the third target cell is a cell that is redetermined by the terminal device and to which the terminal device is to be handed over when the CHO configuration parameter corresponding to the first target cell changes, and the third target cell may be a cell that meets the CHO trigger condition in the candidate cell configured by the network device for the terminal device. The third target cell and the first target cell may be a same cell, or may be different cells.

Optionally, the second CHO configuration information is CHO full configuration information sent by the network device to the terminal device, and the terminal device may determine, based on the second CHO configuration information or based on the first CHO configuration information and the second CHO configuration information, whether to continue to be handed over to the first target cell. Optionally, the second CHO configuration information may include indication information, and the indication information is used to indicate whether the second CHO configuration information is the full configuration information. For example, the indication information may be a binary value. For example, "0" indicates that the second CHO configuration information is not the full configuration information, and "1" indicates that the second CHO configuration information is the full configuration information. Alternatively, the indication information may be a Boolean value. For example, "FALSE" indicates that the second CHO configuration information is not the full configuration information, and "TRUE" indicates that the second CHO configuration information is the full configuration information. Alternatively, the indication information may be represented in another manner. This is not limited in this embodiment of this disclosure.

It should be understood that if the second CHO configuration information is the CHO full configuration information sent by the network device to the terminal device, it may be understood that the second CHO configuration information and the first CHO configuration information are decoupled from each other, and have no association relationship.

With reference to the first aspect, in a possible implementation, when the second CHO configuration information is the CHO full configuration information sent by the network device to the terminal device, the terminal device may determine, based on whether the second CHO configuration information includes a cell identifier (for example, a CGI and/or a PCI) of the first target cell, an index corresponding to the first target cell, measurement information (for example, a measurement frequency or a measurement identifier) corresponding to the first target cell, or other information that may be used to identify the first target cell, whether the configuration parameter corresponding to the first target cell changes. Optionally, if the second CHO configuration information does not include the cell identifier of the first target cell, the index corresponding to the first target cell, the measurement information corresponding to the first target cell, or the like, the terminal device may consider that a candidate cell configured by the network device for the terminal device currently does not include the first target cell, and may further consider that the first target cell may no longer be a cell suitable for the handover of the terminal device. Therefore, the terminal device determines not to continue to be handed over to the first target cell any longer.

With reference to the first aspect, in a possible implementation, when the second CHO configuration information is the CHO full configuration information sent by the network device to the terminal device, the terminal device may determine, with reference to the first CHO configuration information and the second CHO configuration information, for example, by comparing the first CHO configuration information and the second CHO configuration information, whether CHO configuration information (for example, a configuration parameter) corresponding to the first target cell changes. Optionally, that the terminal device determines, by comparing the first CHO configuration information and the second CHO configuration information, whether the CHO configuration information (for example, a configuration parameter) corresponding to the first target cell changes includes: determining whether the first target cell is removed, and/or determining whether a CHO trigger condition corresponding to the first target cell changes, and/or determining whether related information of the first target cell changes. The related information of the first target cell may include a C-RNTI allocated by the first target cell to the terminal device, a random access channel (RACH) resource required for accessing the first target cell, resource information (for example, a physical layer configuration parameter, a MAC layer configuration parameter, an RLC layer configuration parameter, a PDCP layer configuration parameter, an SDAP layer configuration parameter, or an RRC layer configuration parameter) corresponding to the first target cell, or the like. The first CHO configuration information and the second CHO configuration information are compared, so that once the terminal device finds that any parameter corresponding to the first target cell changes, the terminal device determines not to continue to be handed over to the first target cell any longer, and the terminal device performs a subsequent operation based on the second CHO configuration information, for example, determines, based on the second CHO configuration information, whether the CHO trigger condition is met, further determines a target cell that the terminal device may be handed over, and attempts to access the target cell.

With reference to the first aspect, in a possible implementation, the second CHO configuration information is the CHO full configuration information sent by the network device to the terminal device, and the terminal device determines, based on the second CHO configuration information, whether to continue to be handed over to the first target cell.

Optionally, after receiving the second CHO configuration information, the terminal device determines not to continue to be handed over to the first target cell, and redetermines, based on the second CHO configuration information, a cell to which the terminal device may be handed over. In other words, after the terminal device receives the second CHO configuration information, the first CHO configuration information is no longer valid. In other words, the terminal device removes the first CHO configuration information, and stores the second CHO configuration information. In a subsequent operation, the terminal device uses/follows the second CHO configuration information. Specifically, after receiving the second CHO configuration information, the terminal device stops being handed over to the first target cell. The terminal device determines, based on the second CHO configuration information, whether the CHO trigger condition is met, further determines a target cell to which the terminal device may be handed over, and attempts to access the target cell.

It should be understood that, that the terminal device determines not to continue to be handed over to the first target cell means that the terminal device does not continue to be handed over to the first target cell currently. In some possible implementations, if the cell that is redetermined by the terminal device based on the second CHO configuration information and to which the terminal device may be handed over is still the first target cell, the terminal device still performs an operation of being handed over to the first target cell in a new handover procedure.

With reference to the first aspect, in a possible implementation, the second CHO configuration information is information used to change, based on the first CHO configuration information, a candidate cell configured by using the first CHO configuration information (this implementation may be referred to as a delta configuration manner). Optionally, the second CHO configuration information may include indication information, and the indication information is used to indicate whether the second CHO configuration information is delta configuration information. For example, the indication information may be a binary value. For example, "0" indicates that the second CHO configuration information is delta configuration information, and "1" indicates that the second CHO configuration information is not delta configuration information. Alternatively, the indication information may be a Boolean value. For example, "FALSE" indicates that the second CHO configuration information is not delta configuration information, and "TRUE" indicates that the second CHO configuration information is delta configuration information. Alternatively, the indication information may be represented in another manner. This is not limited in this embodiment of this disclosure. It should be understood that, in this implementation, the second CHO configuration information and the first CHO configuration information may have an association relationship. The terminal device may determine, based on the first CHO configuration information and the second CHO configuration information, whether to continue to be handed over to the first target cell.

With reference to the first aspect, in a possible implementation, when the second CHO configuration information is information used to change, based on the first CHO configuration information, a candidate cell configured by using the first CHO configuration information, the terminal device may determine, based on whether the second CHO configuration information includes a cell identifier (for example, a CGI and/or a PCI) of the first target cell, an index corresponding to the first target cell, measurement information (for example, a measurement frequency or a measurement identifier) corresponding to the first target cell, or other information used to identify the first target cell, whether the configuration parameter corresponding to the first target cell changes. Optionally, if the second CHO configuration information includes the cell identifier of the first target cell, the index corresponding to the first target cell, or the measurement information corresponding to the first target cell, the terminal device may consider that the network device changes (for example, modifies or removes) CHO configuration information corresponding to the first target cell, and the terminal device may determine that the configuration parameter corresponding to the first target cell changes.

With reference to the first aspect, in a possible implementation, when the second CHO configuration information is information used to change, based on the first CHO configuration information, the candidate cell configured by using the first CHO configuration information, the terminal device may determine, with reference to the first CHO configuration information and the second CHO configuration information, for example, by comparing the first CHO configuration information and the second CHO configuration information, whether CHO configuration information (for example, a configuration parameter) corresponding to the first target cell changes. Optionally, that the terminal device determines, by comparing the first CHO configuration information and the second CHO configuration information, whether the CHO configuration information (for example, a configuration parameter) corresponding to the first target cell changes includes: determining whether the first target cell is removed, and/or determining whether a CHO trigger condition corresponding to the first target cell changes, and/or determining whether related information of the first target cell changes. The related information of the first target cell may include a C-RNTI allocated by the first target cell to the terminal device, a random access channel (RACH) resource required for accessing the first target cell, resource information (for example, a physical layer configuration parameter, a MAC layer configuration parameter, an RLC layer configuration parameter, a PDCP layer configuration parameter, an SDAP layer configuration parameter, or an RRC layer configuration parameter) corresponding to the first target cell, or the like. The first CHO configuration information and the second CHO configuration information are compared, so that once the terminal device finds that any parameter corresponding to the first target cell changes, the terminal device determines not to continue to be handed over to the first target cell any longer, and the terminal device performs a subsequent operation based on the first CHO configuration information and the second CHO configuration information. For example, the terminal device updates CHO configuration information based on the first CHO configuration information and the second CHO configuration information, and may store the updated CHO configuration information. Further, the terminal device determines a target cell based on the updated CHO configuration information, and attempts to access the target cell.

It should be understood that, in this embodiment of this disclosure, the second CHO configuration information may be used to add a new candidate cell, and/or to modify a configuration parameter of a configured candidate cell (for example, a candidate cell configured by using the first CHO configuration information), and/or to remove the configured candidate cell (for example, the candidate cell configured by using the first CHO configuration information).

With reference to the first aspect, in a possible implementation, the first CHO configuration information and/or the second CHO configuration information are/is carried in a radio resource control (RRC) message.

Optionally, the RRC message may be an existing RRC message, for example, an RRC reconfiguration message, or a newly defined RRC message.

According to a second aspect, a terminal device is provided, including a module or unit configured to perform the method/operation/step/action described in any one of the first aspect or the possible implementations of the first aspect. The module or unit may be implemented by using hardware, software, or a combination of hardware and software.

According to a third aspect, a communications apparatus is provided, and is configured to implement the method according to any one of the first aspect and the possible implementations of the first aspect. The communications apparatus may be the terminal device in the foregoing method design, or may be a chip disposed in the terminal device. In a possible manner, the communications apparatus includes a processor. The processor is coupled to a memory, and may be configured to execute instructions in the memory, to implement the method according to any one of the first aspect and the possible implementations of the first aspect. Optionally, the communications apparatus further includes the memory. Optionally, the communications apparatus further includes a communications interface, and the processor is coupled to the communications interface.

When the communications apparatus is the terminal device, the communications interface may be a transceiver or an input/output interface.

When the communications apparatus is the chip disposed in the terminal device, the communications interface may be an input/output interface.

According to a fourth aspect, a communications apparatus is provided. The communications apparatus includes a transceiver, a processor, and a memory. The processor is configured to control the transceiver to send and receive a signal. The memory is configured to store a computer program. The processor is configured to invoke the computer program from the memory and run the computer program, to enable the communications apparatus to perform the method according to any one of the first aspect or the possible implementations of the first aspect.

According to a fifth aspect, a computer-readable storage medium is provided. The computer-readable storage medium stores instructions. When the instructions are run on a computer, the computer is enabled to perform the method according to any one of the first aspect or the possible implementations of the first aspect.

According to a sixth aspect, a computer program product including instructions is provided. When the computer program product runs on a computer, the computer is enabled to perform the method according to any one of the first aspect or the possible implementations of the first aspect.

According to a seventh aspect, a communications system is provided, including a network device and the foregoing terminal device.

BRIEF DESCRIPTION OF DRAWINGS

FIG. 3 is a schematic flowchart of a handover method according to an embodiment of this disclosure;

DESCRIPTION OF EMBODIMENTS

The following describes the technical solutions of this disclosure with reference to the accompanying drawings.

The technical solutions in the embodiments of this disclosure may be applied to various communications systems, including but not limited to a long term evolution (LTE) system, an LTE frequency division duplex (FDD) system, an LTE time division duplex (TDD) system, a universal mobile telecommunication system (UMTS), a worldwide interoperability for microwave access (WiMAX) communications system, a 5th generation (5G) system, a new radio (NR) system, and a future 6th generation communications system.

It should be further understood that, when the technical solutions in the embodiments of this disclosure are applied to a communications system, the technical solutions may be applied to various access technologies. For example, the technical solutions may be applied to an orthogonal multiple access (OMA) technology or a non-orthogonal multiple access (NOMA) technology. When applied to the orthogonal multiple access technology, the technical solutions may be applied to technologies such as orthogonal frequency division multiple access (OFDMA) or single carrier frequency division multiple access (SC-FDMA). This is not limited in the embodiments of this discousre. When applied to the non-orthogonal multiple access technology, the technical solutions may be applied to technologies such as sparse code multiple access (SCMA), multi-user shared access (MUSA), pattern division multiple access (PDMA), interleave-grid multiple access (IGMA), resource spread multiple access (RSMA), non-orthogonal coded multiple access (NCMA), or non-orthogonal coded access (NOCA). This is not limited in the embodiments of this disclosure.

Figure 1:
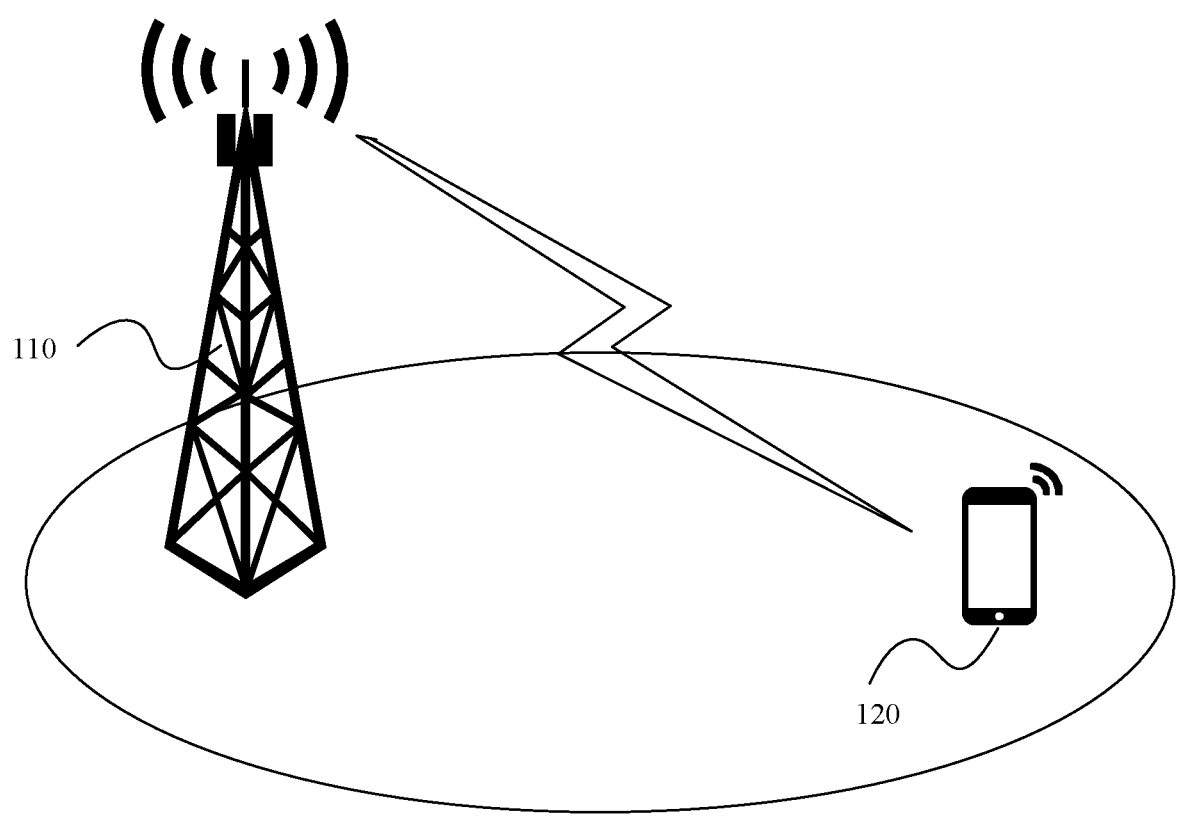
FIG. 1 is a schematic diagram of an application scenario according to an embodiment of this disclosure.

FIG. 1 is a schematic diagram of an application scenario according to an embodiment of this disclosure. As shown in FIG. 1, the application scenario may include a network device 110 and a terminal device 120.

The network device 110 in this embodiment of this disclosure may be a device configured to communicate with the terminal device 120. For example, the network device 110 may be a base station configured to connect the terminal device 120 and a radio access network (RAN). For ease of understanding, in this embodiment of this disclosure, that the network device 110 is a base station is used as an example for description. The base station may sometimes be referred to as an access network device or an access network node. It may be understood that in systems using different radio access technologies, names of devices having functions of the base station may be different. For ease of description, in this embodiment of this disclosure, apparatuses that provide a wireless communication and access function for the terminal are collectively referred to as a base station. For example, the network device 110 may be an evolved NodeB (evolved nodeB, eNB, or eNodeB) in long term evolution (LTE), a next generation base station (gNB) in a 5th generation (5G) mobile communications system, a radio controller in a cloud radio access network (CRAN) scenario, a transmission and reception point (TRP), or a centralized unit (CU) or a distributed unit (DU) in the 5G system or a future mobile communications system. The CU and the DC may be integrated into a same physical device, or may be deployed in separate devices. The CU implements some functions of the gNB, and the DU implements some functions of the gNB. For example, the CU is responsible for processing a non-real-time protocol and service, and implementing functions of a radio resource control (RRC) layer and a packet data convergence protocol (PDCP). The DU is responsible for processing a physical layer protocol and a real-time service, and implementing functions of a radio link control (RLC) layer, a media access control (MAC) layer, and a physical (PHY) layer. Alternatively, the network device 110 may be a relay station, an access point, a vehicle-mounted device, a wearable device, a network device in a 5G network, a network device in a future evolved PLMN network, or the like. This is not limited in this embodiment of this disclosure. The network device 110 may be a macro base station, or may be a micro base station. A coverage area of the network device 110 may include one cell, or may include a plurality of cells.

The terminal device 120 in this embodiment of this disclosure may communicate with one or more core networks (CN) by using an access network device. The terminal device 120 may be a device that has a wireless transmission/reception function. The terminal device 120 may be deployed on land, and include an indoor device, an outdoor device, a handheld device, or a vehicle-mounted device; or may be deployed on the water (for example, on a ship); or may be deployed in the air (for example, on a plane, a balloon, or a satellite). The terminal device 120 may also be referred to as user equipment (UE), an access terminal, a terminal, a subscriber unit, a subscriber station, a mobile station, a mobile console, a remote station, a remote terminal, a mobile device, a user terminal, a wireless network device, a user agent, or a user apparatus. The terminal device 120 may be a cellular phone, a cordless phone, a session initiation protocol (SIP) phone, a smartphone, a wireless local loop (WLL) station, a personal digital assistant (PDA), a handheld device having a wireless communication function, a computing device, another device connected to a wireless modem, a vehicle-mounted device, a wearable device, a drone device, a terminal in the Internet of Things or the Internet of Vehicles, a terminal in any form in a future network, relay user equipment, a terminal in a future evolved public land mobile network (PLMN), or the like. This is not limited in this embodiment of this disclosure. For ease of description, in some embodiments of this disclosure, that the terminal device 120 is UE is used as an example for description.

The network device 110 and the terminal device 120 may transmit an uplink signal or a downlink signal through a transmission link (or referred to as a communications link) between the network device 110 and the terminal device 120. A transmission link from the network device 110 to the terminal device 120 may be referred to as a downlink, and a transmission link from the terminal device 120 to the network device 110 may be referred to as an uplink (uplink).

When the terminal device is in a connected mode, the terminal device moves from one cell to another cell, and the original serving cell cannot continue to provide a service for the terminal device or provides poor quality of service for the terminal device. To avoid service interruption, the terminal device needs to be handed over to a more proper cell, to continue to provide a service for the terminal device, to implement mobility management. The original serving cell may be referred to as a source cell, and a cell that continues to provide a service for the terminal device may be referred to as a target cell. A process of handing over the terminal device from the source cell to the target cell is a handover. The source cell and the target cell may be located within a coverage area of a same network device, or may be located within coverage areas of different network devices. For example, the network device is a base station. Specifically, the source cell and the target cell may belong to a same base station, or may belong to different base stations. In this embodiment of this disclosure, a base station to which the source cell belongs may be referred to as a source base station, and correspondingly, a network device to which the source cell belongs may be referred to as a source network device. A base station to which the target cell belongs may be referred to as a target base station, and correspondingly, a network device to which the target cell belongs may be referred to as a target network device. When the source cell and the target cell belong to a same base station, the source base station and the target base station are the same. In this case, a handover of the terminal device is performed between different cells of the same base station, and may also be referred to as an intra-base station handover in some embodiments. When the source cell and the target cell belong to different base stations, a process of handing over the terminal device from the source cell to the target cell may be considered as a handover performed between different base stations, and may also be referred to as an inter-base station handover in some embodiments.

In a conventional handover procedure, mobility management of a terminal device in a connected mode (for example, UE in a connected mode) is usually controlled by the network device. In other words, the network device sends a handover message, to indicate, to the terminal device, a cell to which the terminal device is to be handed over and how to perform a handover. For example, in FIG. 1, the terminal device 120 is within a coverage area of a source cell managed by the network device 110. When the terminal device 120 needs to be handed over, the network device 110 may send a handover message to the terminal device 120, to control the terminal device 120 to be handed over from the source cell to a target cell. The handover message sent by the network device 110 to the terminal device 120 may be a radio resource control (radio resource control, RRC) message. For example, in an NR system, the RRC message (namely, the handover message) may be an RRC reconfiguration message carrying a reconfiguration with sync (reconfiguration with sync) information element; and in an LTE system, the RRC message (namely, the handover message) may be an RRC connection reconfiguration message carrying a mobility control information element (mobility control info). The handover message sent by the network device 110 to the terminal device 120 includes related information of the target cell and a related configuration parameter required for accessing the target cell by the terminal device 120. For example, the handover message may include the related information of the target cell (for example, a physical cell identifier (PCI) of the target cell and frequency information corresponding to the target cell, a cell radio network temporary identifier (C-RNTI) allocated by the target cell to the terminal device, and random access channel (RACH) resource information required for accessing the target cell by the terminal device, where the RACH resource information may include dedicated RACH resource information and/or common RACH resource information), and other related information. The frequency information corresponding to the target cell may include a frequency corresponding to the target cell. For example, in the NR system, for content included in the frequency information corresponding to the target cell, refer to specific descriptions in the protocol TS38331-f51. Details are not described herein again. After receiving the handover message sent by the network device 110, the terminal device 120 may access the target cell based on information included in the handover message. Therefore, successfully sending the handover message is a necessary condition to ensure a successful handover of the terminal device in a conventional handover mechanism. However, in some communication scenarios (especially in a high-frequency scenario), sending of the handover message may fail due to rapid attenuation of channel quality, rapid movement of the terminal device, obstruction of an object, long duration of measurement, long duration of handover preparation, or the like. Consequently, a radio link failure or a handover failure is caused, and a handover success rate is decreased.

To resolve the foregoing problem that sending of the handover message may fail, and consequently, the handover of the terminal device may fail, a conditional handover (CHO) mechanism may be used to improve the handover success rate. In the CHO mechanism, a handover is performed based on a CHO trigger condition (or a CHO execution condition). When quality of a communications link is good, the network device may notify the terminal device of configuration information of one or more candidate cells and a corresponding CHO trigger condition, and the terminal device may use, as a target cell, a candidate cell that meets the CHO trigger condition. Further, after determining the target cell, the terminal device may be handed over from a source cell to the determined target cell, different from the conventional handover mechanism in which the network device sends the handover message to notify the terminal device of a cell to which the terminal device is to be handed over. The network device may configure one or more candidate cells for the terminal device. When the network device configures one candidate cell for the terminal device, the candidate cell and the source cell may belong to a same base station or different base stations. When the network device configures a plurality of candidate cells for the terminal device, the plurality of candidate cells and the source cell may belong to a same base station or different base stations, and the plurality of candidate cells may also belong to a same base station or different base stations. It should be understood that, in this embodiment of this disclosure, a base station to which the candidate cell belongs may be referred to as a candidate base station, and correspondingly, a network device to which the candidate cell belongs may be referred to as a candidate network device.

Figure 2:
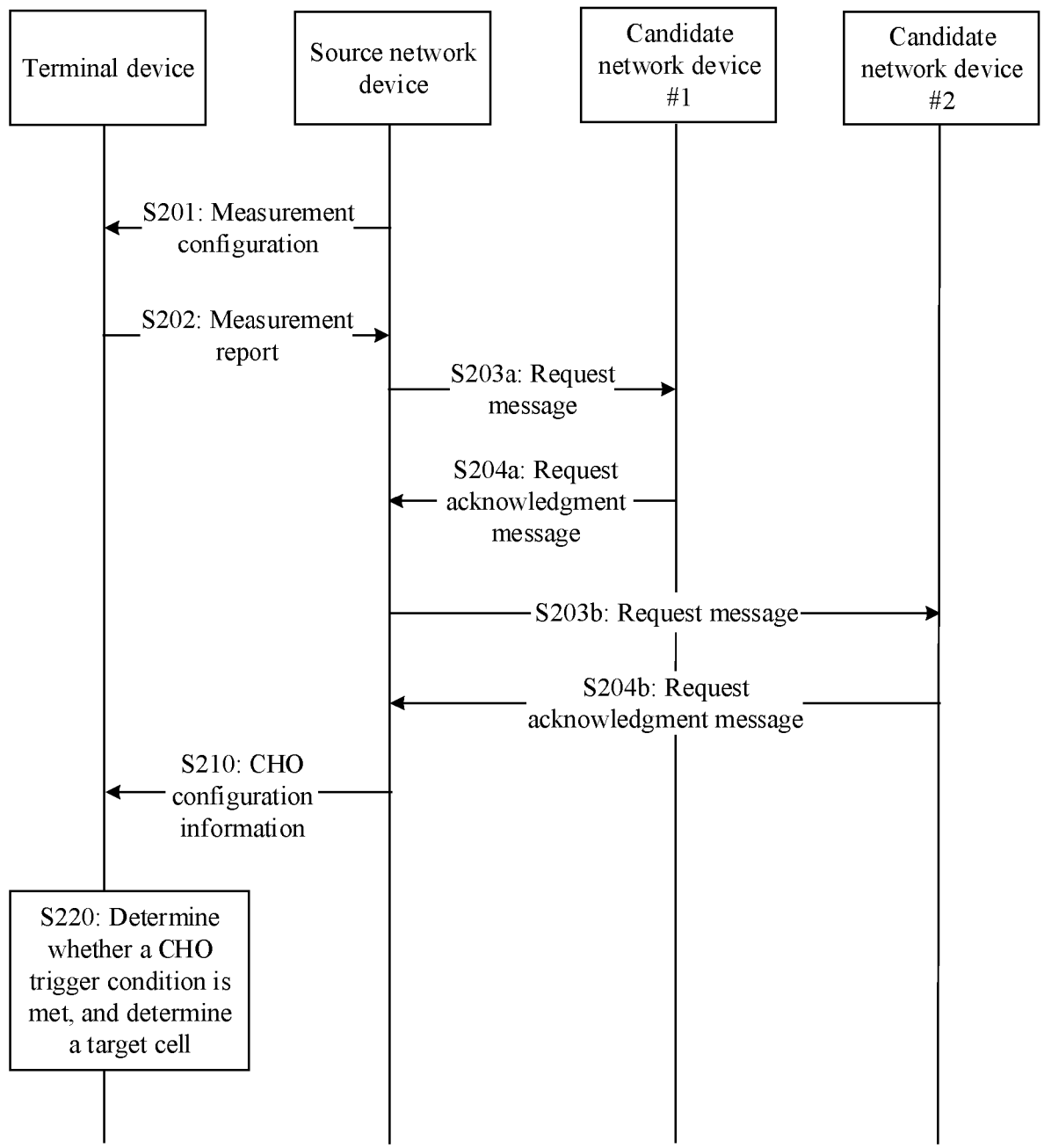
FIG. 2 is a schematic flowchart of a handover procedure according to an embodiment of this disclosure.

For ease of understanding, the following describes a procedure of handing over a terminal device based on a CHO mechanism with reference to FIG. 2. However, it should be understood that a CHO procedure shown in FIG. 2 is merely an example. Some steps may not be performed, or another step is performed in the CHO procedure but is not shown in FIG. 2. In the CHO procedure shown in FIG. 2, a logical sequence of steps may be adjusted, and is not specifically limited in this embodiment of this disclosure.

In step S210, a source network device sends CHO configuration information to a terminal device.

Optionally, the source network device may send the CHO configuration information to the terminal device when quality of a source link is good. It should be understood that the source link is a communications link between the source network device and the terminal device, and includes an uplink and a downlink.

The CHO configuration information may include a CHO trigger condition (or a CHO execution condition), information about one or more candidate cells, or the like. A plurality of candidate cells may have a same CHO trigger condition or different CHO trigger conditions. The information about the candidate cell may include at least one piece of the following information: a cell global identifier (CGI) of the candidate cell, a physical cell identifier (PCI) of the candidate cell, frequency information corresponding to the candidate cell, a C-RNTI allocated by the candidate cell to the terminal device, random access channel (RACH) resource information required for accessing the candidate cell, and the like. The frequency information corresponding to the candidate cell may include one or more of an absolute frequency of a synchronization signal block (SSB) (for example, an absolute frequency SSB), an absolute frequency position (absolute frequency point) (for example, an absolute frequency point A) of a reference resource module (common RB 0), a frequency bandwidth list, a subcarrier spacing (SCS)-specific carrier list (for example, scs-specific carrier list), and the like. The random access channel (RACH) resource information required for accessing the candidate cell may include dedicated RACH resource information and/or common RACH resource information. Optionally, the information about the candidate cell may further include resource information (for example, a physical layer configuration parameter, a media access control (MAC) layer configuration parameter, a radio link control (RLC) layer configuration parameter, a packet data convergence protocol (PDCP) layer configuration parameter, a service data adaptation protocol (SDAP) layer configuration parameter, or a radio resource control (RRC) layer configuration parameter) corresponding to the candidate cell.

It should be noted that, when a network device configures a plurality of candidate cells for the terminal device, the network device may configure, for the terminal device, CHO configuration information corresponding to each of the plurality of candidate cells. In other words, in step S210, the CHO configuration information sent by the source network device to the terminal device includes the CHO configuration information corresponding to each of the plurality of candidate cells. The CHO configuration information corresponding to each candidate cell may include a CHO trigger condition (or a CHO execution condition) corresponding to the candidate cell and information about the candidate cell. The information about the candidate cell may include at least one piece of the following information: a CGI and a PCI of the candidate cell, frequency information corresponding to the candidate cell, a C-RNTI allocated by the candidate cell to the terminal device, RACH resource information required for accessing the candidate cell, resource information (for example, a physical layer configuration parameter, a MAC layer configuration parameter, an RLC layer configuration parameter, a PDCP layer configuration parameter, an SDAP layer configuration parameter, or an RRC layer configuration parameter) corresponding to the candidate cell, and the like. Each candidate cell may correspond to a same CHO trigger condition or a different CHO trigger condition. This is not limited in this embodiment of this disclosure. It can be understood that, when the plurality of candidate cells configured by the network device for the terminal device correspond to a same CHO trigger condition, the network device may configure one common CHO trigger condition for the plurality of candidate cells, and does not need to configure a corresponding CHO trigger condition for each candidate cell. For example, when the plurality of candidate cells configured by the network device for the terminal device correspond to a same CHO trigger condition, the CHO configuration information sent by the network device to the terminal device may include information about the plurality of candidate cells and one common CHO trigger condition. After the terminal device receives the CHO configuration information sent by the network device, the terminal device determines that the plurality of candidate cells included in the CHO configuration information share the CHO trigger condition included in the CHO configuration information. In other words, the plurality of candidate cells included in the CHO configuration information each correspond to the CHO trigger condition included in the CHO configuration.

The CHO configuration information in S210 may be included in an RRC message or another message. This is not limited in this embodiment of this disclosure.

In step S220, after the terminal device receives the CHO configuration information, the terminal device may determine, based on the CHO configuration information, whether the CHO trigger condition (or the CHO execution condition) is met, and determine a target cell.

In this step, the terminal device may determine, based on the CHO configuration information, whether a configured candidate cell meets the CHO trigger condition, to use, as the target cell, a candidate cell that meets the CHO trigger condition. If a plurality of candidate cells meet the CHO trigger condition, the terminal device may select, as the target cell according to a rule, one cell from the plurality of candidate cells that meet the CHO trigger condition. For example, a cell with highest cell signal quality in the plurality of candidate cells that meet the CHO trigger condition is determined as the target cell, or a cell with a highest priority (for example, a highest frequency priority) in the plurality of candidate cells that meet the CHO trigger condition is determined as the target cell, or a cell with a largest quantity of excellent beams (the excellent beam is a beam whose signal quality is higher than a predetermined threshold, the predetermined threshold may be included in a first message or may be agreed in a protocol, and this is not limited in this disclosure) in the plurality of candidate cells that meet the CHO trigger condition is determined as the target cell, or any cell in the plurality of candidate cells that meet the CHO trigger condition is determined as the target cell, or the target cell is determined in another manner, or the rule is determined by the terminal device. This is not limited in this embodiment of this disclosure.

Optionally, the terminal device may determine, based on cell signal quality (for example, reference signal received power (RSRP) and/or reference signal received quality (RSRQ)) obtained through measurement based on radio resource management (RRM), whether the CHO trigger condition is met. For example, the candidate cell configured by the network device for the terminal device includes a candidate cell #1. For the candidate cell #1, a CHO trigger event type that is configured by the network device is an A3 event, and a configured corresponding threshold is an offset value. When cell signal quality of the candidate cell #1 is higher than cell signal quality of a serving cell (namely, a source cell) by the offset, it is considered that the candidate cell #1 meets the CHO trigger condition, and the terminal device may determine the candidate cell #1 as the target cell. In this case, the terminal device may be handed over from the serving cell to the candidate cell #1. For another example, in addition to the candidate cell #1, the candidate cell configured by the network device for the terminal device includes a candidate cell #2. For the candidate cell #2, a CHO trigger event type that is configured by the network device is an A5 event, and configured corresponding thresholds are J and K. When cell signal quality of the candidate cell #2 is greater than K and cell signal quality of a serving cell (namely, a source cell) is less than J, it is considered that the candidate cell #2 meets the CHO trigger condition, and the terminal device may determine the candidate cell #2 as the target cell. In this case, the terminal device may be handed over from the serving cell to the candidate cell #2.

It should be understood that a CHO trigger event type configured by the network device for a candidate cell may be determined based on an actual requirement. If a candidate cell meets a CHO trigger condition corresponding to the CHO trigger event type, it is considered that the candidate cell may be determined as the target cell.

Optionally, after step S220, the terminal device may perform a random access (RACH) process with the determined target cell. For example, the target cell and the source cell belong to different network devices. After step 220, the terminal device performs the RACH process with a network device to which the target cell belongs, namely, a target network device (for example, a candidate network device #1 in FIG. 2). If the target cell and the source cell belong to a same network device, the terminal device may not need to perform the RACH process with the target cell (or a target network device, namely, a source network device).

When the random access process is completed, the terminal device may send, to the target network device to which the target cell belongs, a message indicating that a CHO is completed, for example, the RRC message. For example, the RRC message may be an RRC reconfiguration complete message, and is used to notify the target network device that the conditional handover is completed, and the terminal device is successfully handed over to the target cell. When the target cell and the source cell belong to a same network device, the target network device is the source network device, and the terminal device notifies the source network device that the conditional handover is completed.

In this case, UE is successfully handed over from the source cell to the target cell. In the CHO mechanism, the source network device sends the conditional handover configuration information (namely, the CHO configuration information) to the terminal device when communication quality of the source link is good. Therefore, a success rate of sending the CHO configuration information is ensured. Further, the terminal device selects the target cell based on the CHO configuration information and performs a handover, so that the handover success rate is improved.

Before step S210, the source network device and the terminal device may perform a measurement procedure, for example, step S201 and step S202 shown in FIG. 2.

In step S201, the source network device sends a measurement configuration to the terminal device by using an RRC reconfiguration message to carry the measurement configuration.

In step S202, after receiving the measurement configuration, the terminal device measures a measurement object, and after assessing that a measurement result meets a reporting trigger condition, the terminal device sends a corresponding measurement report to the source network device. The source network device performs a CHO handover preparation procedure based on the measurement report reported by the terminal device. For example, after the source network device determines the candidate cell based on the measurement report, the source network device and a candidate network device to which the candidate cell belongs perform handover preparation.

Optionally, if the candidate cell determined by the source network device and the source cell belong to different network devices, the source network device and the candidate network device perform signaling interaction.

For example, as shown in FIG. 2, candidate cells determined by the source network device include a candidate cell #1 and a candidate cell #2, the candidate cell #1 belongs to the candidate network device #1, and the candidate cell #2 belongs to a candidate network device #2. In step S203a and step S203b, the source network device separately sends a request message to the candidate network device #1 and the candidate network device #2, to request the candidate network device #1 and the candidate network device #2 to prepare for the conditional handover. The request message may be a handover request message or another message. This is not limited in this embodiment of this disclosure. In step S204a and step S204b, the candidate network device #1 and the candidate network device #2 separately send a request acknowledgment message to the source network device. The request acknowledgment message may be a handover request acknowledgment message or another message. This is not limited in this embodiment of this disclosure. The request acknowledgment message may include information about a candidate cell. For example, the request acknowledgment message in S204a may include information about the candidate cell #1, and the request acknowledgment message in S204b may include information about the candidate cell #2. Specifically, for content included in the information about the candidate cell, refer to step S210. Details are not described herein again. It should be understood that, that there are only two candidate network devices and each candidate network device includes one candidate cell is used as an example for description in FIG. 2. In another embodiment, the source network device may perform signaling interaction with a plurality of candidate network devices, and each candidate network device may alternatively include a plurality of candidate cells. Alternatively, the source network device may perform signaling interaction with a same candidate network device for a plurality of times. If both the candidate cell and the source cell belong to the source network device, the source network device may perform handover preparation (for example, perform admission control and resource allocation) for the candidate cell. In other words, a handover preparation process of the conditional handover may not be performed (for example, a handover request and a handover request acknowledgment may be omitted).

As described above, the source network device may perform handover preparation for a conditional handover with one or more candidate cells, and the CHO configuration information sent by the source network device to the terminal device may include CHO configuration information corresponding to the one or more candidate cells. CHO configuration information corresponding to each of the one or more candidate cells may change. In the CHO mechanism, the source network device may maintain a radio resource control (RRC) connection and data transmission with the terminal device until the terminal device is successfully handed over to a cell. The network device (for example, the source network device or the target network device) may send CHO full configuration information to replace the previously sent CHO configuration information. For example, the network device may reconfigure a candidate cell for the terminal device. Alternatively, the network device performs operations such as addition, modification, or removal on a configured candidate cell based on the previously sent CHO configuration information. For example, the network device may configure a new candidate cell for the terminal device, remove the previously configured candidate cell, or modify CHO configuration information corresponding to the configured candidate cell. In other words, the network device may provide the terminal device with CHO configuration information corresponding to the new candidate cell, may modify the CHO configuration information corresponding to the configured candidate cell, may remove the CHO configuration information corresponding to the configured candidate cell, may send the CHO configuration information corresponding to the reconfigured candidate cell to the terminal device, or the like.

Specifically, in an implementation, the source network device determines to configure a new candidate cell, remove the previously configured candidate cell, modify the CHO configuration information corresponding to the configured candidate cell, or reconfigure a candidate cell for the terminal device. That is, a change in the CHO configuration information is triggered by the source network device. Alternatively, in another implementation, the candidate network device determines to configure a new candidate cell, remove the previously configured candidate cell, modify the CHO configuration information corresponding to the configured candidate cell, or reconfigure a candidate cell for the terminal device. That is, a change in the CHO configuration information is triggered by the candidate network device. Then, the candidate network device notifies the source network device of the changed CHO configuration information, and the source network device sends the changed CHO configuration information to the terminal device. In the foregoing two implementations, the source network device may provide the changed CHO configuration information to the terminal device. In other words, the source network device may perform step S210 in FIG. 2 for a plurality of times.

Usually, after determining the target cell based on the CHO configuration information (for example, first CHO configuration information) sent by the network device, the terminal device may perform a random access procedure with the network device to which the target cell belongs. After random access succeeds, it may be considered that the terminal device is successfully handed over from the source cell to the target cell. However, in some cases, after the terminal device determines the target cell based on the CHO configuration information sent by a network, in a process in which the terminal device attempts to access the target cell, the terminal device may further receive CHO configuration information (for example, second CHO configuration information) to be sent by the network device subsequently. The second CHO configuration information subsequently received by the terminal device may be used to change (for example, add, modify, remove, or completely replace) the first CHO configuration information. Currently, how the terminal device performs processing in this case is not considered in the conventional technology.

An embodiment of this disclosure provides a method, to resolve a problem of how the terminal device performs processing when the terminal device receives other CHO configuration information in a process of attempting to access a target cell, to improve CHO reliability, and ensure system performance. The following describes in detail the embodiments of this disclosure with reference to FIG. 3.

FIG. 3 is a schematic flowchart of a handover method according to an embodiment of this disclosure. A method 300 in FIG. 3 may be performed by a terminal device. The terminal device may be, for example, the terminal device 120 shown in FIG. 1 or the terminal device shown in FIG. 2. The method 300 may include step S310 and step S320.

Step S310: Determine a first target cell based on first conditional handover (CHO) configuration information.

The first target cell is a cell to which the terminal device is to be handed over.

A network device may configure one or more candidate cells for the terminal device, the first target cell is included in the one or more candidate cells, and the first target cell is a cell that meets a CHO trigger condition in the one or more candidate cells.

The first CHO configuration information may include the CHO trigger condition and related information of a candidate cell. The CHO trigger condition may include a CHO trigger event type and a corresponding threshold. The CHO trigger event type may include, for example, an event A3, an event A4, an event A5, an event B1, an event B2, or another trigger event type. The related information of the candidate cell may include at least one piece of the following information: a cell identifier (for example, a CGI and/or a PCI) of the candidate cell, frequency information (for example, an absolute frequency of a synchronization signal block (SSB), an absolute frequency position of a reference resource module, a frequency bandwidth list, or an SCS-specific carrier list) corresponding to the candidate cell, a C-RNTI allocated by the candidate cell to the terminal device, random access channel (RACH) resource information required for accessing the candidate cell, and the like. Optionally, the related information of the candidate cell may further include resource information (for example, a physical layer configuration parameter, a MAC layer configuration parameter, an RLC layer configuration parameter, a PDCP layer configuration parameter, an SDAP layer configuration parameter, or an RRC layer configuration parameter) corresponding to the candidate cell.

For example, if a configured CHO trigger event type is the event A3 (which may also be referred to as an A3 event), and a configured corresponding threshold is a first threshold (for example, the first threshold is an offset (offset)), when cell signal quality of a candidate cell is higher than cell signal quality of a serving cell by the first threshold, the terminal device may determine that the candidate cell meets the CHO trigger condition. If a configured CHO trigger event type is the event A5 (which may also be referred to as an A5 event), and a configured corresponding threshold is a second threshold or a third threshold, when cell signal quality of a candidate cell is higher than the second threshold, and cell signal quality of a serving cell is lower than the third threshold, the terminal device may determine that the candidate cell meets the CHO trigger condition.

It should be understood that the foregoing descriptions of the trigger event type are merely an example. In some implementations, the CHO trigger event type and whether the CHO trigger condition is met may be defined in another definition manner. This is not limited in this embodiment.

The network device may configure one or more candidate cells for the terminal device, and the first CHO configuration information may include CHO configuration information corresponding to each of the one or more candidate cells. The CHO configuration information corresponding to each candidate cell may include a CHO trigger condition corresponding to the candidate cell and related information corresponding to the candidate cell (for example, a cell identifier of the candidate cell, frequency information corresponding to the candidate cell, a C-RNTI allocated by the candidate cell to the terminal device, or random access channel (RACH) resource information required for accessing the candidate cell). Optionally, the related information of the candidate cell may further include resource information (for example, a physical layer configuration parameter, a MAC layer configuration parameter, an RLC layer configuration parameter, a PDCP layer configuration parameter, an SDAP layer configuration parameter, or an RRC layer configuration parameter) corresponding to the candidate cell. Each of the one or more candidate cells may correspond to a same CHO trigger condition or a different CHO trigger condition. In other words, different candidate cells may correspond to a same CHO trigger condition, or may correspond to different CHO trigger conditions. This is not specifically limited in this embodiment of this disclosure.

The first CHO configuration information may be included in an RRC message or another message. This is not limited in this embodiment of this disclosure.

The first target cell and a serving cell in which the terminal device is currently located may belong to a same network device, or may belong to different network devices. In other words, for example, the network device is a base station. The first target cell and the serving cell (namely, a source cell) in which the terminal device is currently located may belong to a same base station, or may belong to different base stations.

Step S320: In a process of attempting to access the first target cell, if receiving second CHO configuration information, determine, based on the second CHO configuration information, whether to continue to be handed over to the first target cell.

The process of attempting to access the first target cell may include a process before sending a preamble to the first target cell, and/or a process of performing random access (RACH) to the first target cell. For example, in an LTE system or an NR system, the process of attempting to access the first target cell includes: the process before the terminal device sends the preamble to the first target cell; and/or a process after the terminal device sends the preamble to the first target cell and before the terminal device receives a random access response (random access response, RAR); and/or a process after the terminal device receives the RAR and before the terminal device sends an RRC reconfiguration complete message to the first target cell; and/or a process after the terminal device sends the preamble to the first target cell and before the terminal device sends the RRC reconfiguration complete message to the first target cell. Alternatively, optionally, the process of attempting to access the first target cell includes: a process before the terminal device sends an RRC reconfiguration complete message to the first target cell. It should be understood that the process of attempting to access the first target cell may be understood as a procedure that needs to be completed, after the terminal device determines the first target cell to which the terminal device is to be handed over, by the terminal device to be handed over to the first target cell. In addition, that the process of attempting to access the first target cell includes the process before the terminal device sends the preamble to the first target cell may be understood as follows: A process in which the terminal device determines the first target cell based on the first CHO configuration information, and is to send the preamble to the first target cell belongs to the process in which the terminal device attempts to access the first target cell.

In the technical solution provided in this embodiment of this disclosure, the terminal device determines the first target cell based on the first CHO configuration information. In the process in which the terminal device attempts to access the first target cell, if the terminal device receives the second CHO configuration information, the terminal device may determine, based on the second CHO configuration information, whether to continue to access the determined first target cell, so that the terminal device can perform correct processing based on CHO configuration information provided by the network device, to improve conditional handover reliability, and ensure system performance.

The second CHO configuration information has a plurality of forms.

In an example, the second CHO configuration information may be information used to change, based on the first CHO configuration information, a candidate cell configured by using the first CHO configuration information (this manner may be referred to as a delta configuration manner). For example, based on the first CHO configuration information, the second CHO configuration information may be used to add a new candidate cell, and/or to modify a configuration parameter of a configured candidate cell (for example, the candidate cell configured by using the first CHO configuration information), and/or to remove the configured candidate cell (for example, the candidate cell configured by using the first CHO configuration information). For example, the second CHO configuration information is used to add a new candidate cell (for example, the second CHO configuration information includes a CHO trigger condition corresponding to the newly to-be-added candidate cell and/or related information of the newly to-be-added candidate cell), or the second CHO configuration information may be used to modify configuration information (for example, including a CHO trigger condition corresponding to the modified candidate cell and/or related information corresponding to the modified candidate cell) corresponding to a configured cell (for example, the candidate cell configured by using the first CHO configuration information), or the second CHO configuration information may be used to remove a configured candidate cell (for example, the candidate cell configured by using the first CHO configuration information) (for example, removing a CHO trigger condition corresponding to the configured candidate cell, and/or removing related information of the configured candidate cell, and/or removing a measurement identifier, a measurement frequency, or the like that corresponds to the configured candidate cell). For the related information of the candidate cell, refer to the foregoing descriptions. Details are not described herein again.

Correspondingly, the terminal device may change a configuration parameter based on a received second CHO configuration and the received first CHO configuration information. For example, based on the first CHO configuration information, if the second CHO configuration information is used to add a new candidate cell, the terminal device adds the new candidate cell, including adding a CHO trigger condition corresponding to the new candidate cell, adding related information of the new candidate cell, and/or the like; if the second CHO configuration information is used to modify the configuration information corresponding to the configured candidate cell (for example, the candidate cell configured by using the first CHO configuration information), the terminal device may modify a trigger condition corresponding to the configured candidate cell and/or related information of the configured candidate cell to the CHO trigger condition corresponding to the modified configured candidate cell and/or the related information of the modified configured candidate cell; if the second CHO configuration information is used to remove the configured candidate cell (for example, the candidate cell configured by using the first CHO configuration information), the terminal device may remove a CHO trigger condition corresponding to the configured candidate cell, and/or remove the related information of the configured candidate cell, and/or remove the configured measurement identifier, the measurement frequency, or the like that corresponds to the configured candidate cell. In other words, the terminal device removes the candidate cell, and no longer determines whether the candidate cell meets the CHO trigger condition. Further, the terminal device is not handed over to the candidate cell.

It should be understood that, the second CHO configuration information is information used to change, based on the first CHO configuration information, the candidate cell configured by using the first CHO configuration information. It may also be expressed as follows: The second CHO configuration information is delta configuration information of the first CHO configuration information, and the second CHO configuration information and the first CHO configuration information may have an association relationship.

In another example, the second CHO configuration information may be CHO full configuration information sent by the network device to the terminal device. In other words, the second CHO configuration information and the first CHO configuration information are independent of and decoupled from each other, and have no association relationship. Correspondingly, the terminal device may completely replace the previously received first CHO configuration information with the received second CHO configuration information, and may perform a conditional handover procedure based on the second CHO configuration information; or the terminal device may perform a conditional handover procedure based on the second CHO configuration information and the first CHO configuration information. A candidate cell that is configured by the network device for the terminal device and that is indicated in the second CHO configuration information may be completely the same as, partially the same as, or completely different from a candidate cell that is configured by the network device for the terminal device and that is indicated in the first CHO configuration information. The candidate cell that is configured by the network device for the terminal device and that is indicated in the second CHO configuration information may include the first target cell, or may not include the first target cell. This is not specifically limited in this embodiment of this disclosure.

The second CHO configuration information may be included in an RRC message or another message. This is not limited in this embodiment of this disclosure. Optionally, an RRC message including the second CHO configuration information may include indication information (for example, first indication information) used to indicate whether the second CHO configuration information is the full configuration information, and/or include indication information (for example, second indication information) used to indicate whether the second CHO configuration information is delta configuration information.

For example, the first indication information may be a binary value. For example, "0" indicates that the second CHO configuration information is not the full configuration information, and "1" indicates that the second CHO configuration information is the full configuration information. Alternatively, the indication information may be a Boolean value. For example, "FALSE" indicates that the second CHO configuration information is not the full configuration information, and "TRUE" indicates that the second CHO configuration information is the full configuration information. Alternatively, the first indication information may be represented in another manner. This is not limited in this embodiment of this disclosure. Similarly, the second indication information may be a binary value. For example, "0" indicates that the second CHO configuration information is delta configuration information, and "1" indicates that the second CHO configuration information is not delta configuration information. Alternatively, the indication information may be a Boolean value. For example, "FALSE" indicates that the second CHO configuration information is not delta configuration information, and "TRUE" indicates that the second CHO configuration information is delta configuration information. Alternatively, the second indication information may be represented in another manner. This is not limited in this embodiment of this disclosure.

It should be noted that, that the terminal device determines, based on the second CHO configuration information, whether to continue to be handed over to the first target cell in step S320 may also be understood as follows: The terminal device determines, based on the second CHO configuration information, whether to continue to access the first target cell, or whether to continue to perform a random access process with the first target cell. When the terminal device does not need to perform the random access procedure with the first target cell after determining the first target cell, that the terminal device determines, based on the second CHO configuration information, whether to continue to be handed over to the first target cell may alternatively be understood as follows: The terminal device determines, based on the second CHO configuration information, whether to send the RRC reconfiguration complete message to the first target cell.

There are a plurality of manners in which the terminal device determines, based on the second CHO configuration information, whether to continue to be handed over to the first target cell.

In an example, if the second CHO configuration information is information used to change (for example, add/modify/remove), based on the first CHO configuration information, the configured candidate cell (for example, the candidate cell configured by using the first CHO configuration information), the terminal device may determine, based on the first CHO configuration information and the second CHO configuration information, whether to continue to be handed over to the first target cell. For example, if the terminal device determines, based on the first CHO configuration information and the second CHO configuration information, that the first target cell does not change, specifically, for example, a CHO configuration parameter corresponding to the first target cell does not change, the terminal device determines to continue to be handed over to the first target cell. If the terminal device determines, based on the first CHO configuration information and the second CHO configuration information, that the first target cell changes, specifically, for example, a CHO configuration parameter corresponding to the first target cell changes, the terminal device determines, based on the first CHO configuration information and the second CHO configuration information, a third target cell to which the terminal device is to be handed over. In other words, if the terminal device determines, based on the first CHO configuration information and the second CHO configuration information, that the first target cell changes, for example, determines that the CHO configuration parameter corresponding to the first target cell changes, the terminal device determines not to continue to be handed over to the first target cell any longer, determines to stop being handed over to first target cell, or determines to stop a random access process with the first target cell. Further, the terminal device may select, as the third target cell based on latest CHO configuration information, a cell that satisfies the CHO configuration information, to attempt to access the third target cell. The terminal device determines the latest CHO configuration information with reference to the first CHO configuration information and the second CHO configuration information. Optionally, the CHO configuration parameter corresponding to the first target cell may include at least one of the following: a CHO trigger condition corresponding to the first target cell, a C-RNTI allocated by the first target cell to the terminal device, a random access channel (RACH) resource required for accessing the first target cell, resource information (for example, a physical layer configuration parameter, a MAC layer configuration parameter, an RLC layer configuration parameter, a PDCP layer configuration parameter, an SDAP layer configuration parameter, or an RRC layer configuration parameter) corresponding to the first target cell, and the like.

It should be understood that, when determining that the CHO configuration parameter corresponding to the first target cell does not change, the terminal device may consider that the first target cell still meets the CHO trigger condition, and the first target cell is still a target cell suitable for a handover of the terminal device. Therefore, the terminal device may continue to be handed over to the first target cell. A procedure in which the terminal device redetermines the target cell, re-attempts to access a target cell that meets the CHO trigger condition, or the like is avoided, so that complexity can be reduced, and energy consumption of the terminal device can be reduced. When the terminal device determines that the CHO configuration parameter corresponding to the first target cell changes, the first target cell may no longer be a cell suitable for a handover of the terminal device, and the terminal device may redetermine, based on latest configuration information obtained after a change, a target cell to which the terminal device may be handed over, to avoid handing over the terminal device to an improper cell, or avoid service interruption caused by a failure of a handover between the terminal device and the first target cell. The target cell to which the terminal device may be handed over is redetermined, to improve conditional handover reliability, improve a handover success rate, and ensure system performance.

Further, there may be a plurality of manners in which the terminal device determines, based on the first CHO configuration information and the second CHO configuration information, whether the CHO configuration parameter corresponding to the first target cell changes.

That the terminal device determines whether the CHO configuration parameter corresponding to the first target cell changes may include: determining whether the first target cell is removed, and/or whether the CHO trigger condition corresponding to the first target cell changes, and/or whether related information of the first target cell (for example, the C-RNTI allocated by the first target cell to the terminal device, and/or the random access channel (RACH) resource required for accessing the first target cell, and/or the resource information (for example, the physical layer configuration parameter, the MAC layer configuration parameter, the RLC layer configuration parameter, the PDCP layer configuration parameter, the SDAP layer configuration parameter, or the RRC layer configuration parameter) corresponding to the first target cell) changes.

For example, the terminal device may determine, based on whether the second CHO configuration information includes a cell identifier (for example, a CGI and/or a PCI) of the first target cell, an index corresponding to the first target cell (for example, the first CHO configuration information includes the index corresponding to the first target cell), measurement information (for example, a measurement frequency or a measurement identifier) corresponding to the first target cell, or other information that may be used to identify the first target cell, whether the configuration parameter of the first target cell changes.

Alternatively, for example, the terminal device may determine, with reference to the first CHO configuration information and the second CHO configuration information, for example, by comparing the first CHO configuration information and the second CHO configuration information, whether CHO configuration information (for example, a configuration parameter) corresponding to the first target cell changes. Optionally, that the terminal device determines, by comparing the first CHO configuration information and the second CHO configuration information, whether the CHO configuration information (for example, the configuration parameter) corresponding to the first target cell changes includes: determining whether the first target cell is removed, and/or determining whether the CHO trigger condition corresponding to the first target cell changes, and/or determining whether the related information of the first target cell changes. For the related information of the first target cell, refer to the foregoing descriptions. Details are not described again. The first CHO configuration information and the second CHO configuration information are compared, so that once the terminal device finds that any parameter corresponding to the first target cell changes, the terminal device determines not to continue to be handed over to the first target cell any longer, and the terminal device performs a subsequent operation based on the first CHO configuration information and the second CHO configuration information. For example, the terminal device updates CHO configuration information based on the first CHO configuration information and the second CHO configuration information, and may store the updated CHO configuration information. Further, the terminal device determines a target cell based on the updated CHO configuration information, and attempts to access the target cell.

By way of example instead of limitation, if the second CHO configuration information does not include the cell identifier of the first target cell, the index corresponding to the first target cell, the measurement information (for example, the measurement frequency or the measurement identifier) corresponding to the first target cell, the information used to identify the first target cell, parameter information corresponding to the first target cell, or the like, the terminal device may determine that the configuration parameter of the first target cell does not change. Correspondingly, the terminal device may determine to continue to be handed over to the first target cell. In other words, the second CHO configuration information does not include information used to add/modify/remove the first target cell or the configuration parameter corresponding to the first target cell. The terminal device may consider that the first target cell is still a cell suitable for the handover of the terminal device, and therefore, the terminal device may continue to be handed over to the first target cell. If the second CHO configuration information includes any one or more of the cell identifier of the first target cell, the index corresponding to the first target cell, the measurement information (for example, the measurement frequency or the measurement identifier) corresponding to the first target cell, the information used to identify the first target cell, and parameter information corresponding to the first target cell, the terminal device may determine that the configuration parameter of the first target cell changes. Correspondingly, the terminal device may determine not to continue to be handed over to the first target cell any longer. In other words, the second CHO configuration information includes information used to add/modify/remove the first target cell or the configuration parameter corresponding to the first target cell. The terminal device may consider that the first target cell may no longer be a cell suitable for the handover of the terminal device, and therefore, the terminal device determines not to continue to be handed over to the first target cell any longer.

In another example, if the second CHO configuration information is the CHO full configuration information sent by the network device to the terminal device, the terminal device may determine, based on the first CHO configuration information and the second CHO configuration information, whether to continue to be handed over to the first target cell. Optionally, that the terminal device determines, by comparing the first CHO configuration information and the second CHO configuration information, whether the CHO configuration information (for example, the configuration parameter) corresponding to the first target cell changes includes: determining whether the first target cell is removed, and/or determining whether the CHO trigger condition corresponding to the first target cell changes, and/or determining whether the related information of the first target cell changes. For the related information of the first target cell, refer to the foregoing descriptions. Details are not described again. The first CHO configuration information and the second CHO configuration information are compared, so that once the terminal device finds that any parameter corresponding to the first target cell changes, the terminal device determines not to continue to be handed over to the first target cell any longer, and the terminal device performs a subsequent operation based on the second CHO configuration information, for example, determines, based on the second CHO configuration information, whether the CHO trigger condition is met, further determines a target cell that the terminal device may be handed over, and attempts to access the target cell.

For example, if the terminal device determines, based on the first CHO configuration information and the second CHO configuration information, that the first target cell does not change, specifically, for example, the CHO configuration parameter corresponding to the first target cell does not change, the terminal device determines to continue to be handed over to the first target cell. If the terminal device determines, based on the first CHO configuration information and the second CHO configuration information, that the first target cell changes, specifically, for example, the CHO configuration parameter corresponding to the first target cell changes, the terminal device determines, based on the second CHO configuration information, the third target cell to which the terminal device is to be handed over. If the terminal device determines, based on the first CHO configuration information and the second CHO configuration information, that a candidate cell configured by using the second CHO configuration information does not include the first target cell, specifically, for example, the second CHO configuration information does not include the CHO configuration parameter corresponding to the first target cell, the terminal device determines, based on the second CHO configuration information, the third target cell to which the terminal device is to be handed over. In other words, if the terminal device determines, based on the first CHO configuration information and the second CHO configuration information, that the first target cell changes (for example, determines that the CHO configuration parameter corresponding to the first target cell changes), or determines that the network device does not configure the first target cell for the terminal device as a candidate cell by using the second CHO configuration information (for example, the second CHO configuration information does not include the CHO configuration parameter corresponding to the first target cell), the terminal device determines not to continue to be handed over to the first target cell any longer, determines to stop being handed over to the first target cell, or determines to stop a random access process with the first target cell. Further, the terminal device may select, as the third target cell based on the latest CHO configuration information, the cell that satisfies the CHO configuration information, to attempt to access the third target cell. The second CHO configuration information received by the terminal device is the latest CHO configuration information.

Further, there may be a plurality of manners in which the terminal device determines, based on the first CHO configuration information and the second CHO configuration information, whether the CHO configuration parameter corresponding to the first target cell changes.

For example, the terminal device may determine, based on whether the second CHO configuration information includes the cell identifier (for example, the CGI and/or the PCI) of the first target cell, the index corresponding to the first target cell, the measurement information (for example, the measurement frequency or the measurement identifier) corresponding to the first target cell, and the information used to identify the first target cell, whether the configuration parameter of the first target cell changes, or the terminal device may determine, based on the first CHO configuration information and the second CHO configuration information, whether the CHO configuration information (for example, the configuration parameter) corresponding to the first target cell changes.

By way example instead of limitation, if the second CHO configuration information does not include the cell identifier of the first target cell, the index corresponding to the first target cell, the measurement information (for example, the measurement frequency or the measurement identifier) corresponding to the first target cell, or the information used to identify the first target cell, the terminal device may determine that the candidate cell configured by the network device for the terminal device by using the second CHO configuration information do not include the first target cell. Correspondingly, the terminal device may determine not to continue to be handed over to the first target cell any longer. In other words, because the second CHO configuration information is CHO full configuration information newly sent by the network device, if the second CHO configuration information does not include the CHO configuration information corresponding to the configured first target cell, the terminal device may consider that the network device does not configure the first target cell for the terminal device as a candidate cell currently, and may further consider that the first target cell may no longer be a cell suitable for the handover of the terminal device. Therefore, the terminal device determines not to continue to be handed over to the first target cell any longer.

If the second CHO configuration information includes one or more of the cell identifier of the first target cell, the index corresponding to the first target cell, the measurement information (for example, the measurement frequency or the measurement identifier) corresponding to the first target cell, or the information used to identify the first target cell, and another configuration parameter that corresponds to the first target cell and that is included in the second CHO configuration information is different from another configuration parameter that corresponds to the first target cell and that is included in the first CHO configuration information, the terminal device may determine that the candidate cell configured by the network device for the terminal device by using the second CHO configuration information includes the first target cell, but the configuration parameter of the first target cell changes. Correspondingly, the terminal device may determine not to continue to be handed over to the first target cell any longer. In other words, if the second CHO configuration information includes the CHO configuration information corresponding to the configured first target cell, it may be considered that a candidate cell subsequently configured by the network device for the terminal device still includes the first target cell, but because the configuration parameter corresponding to the first target cell changes, the terminal device may consider that the first target cell may no longer be a cell suitable for the handover of the terminal device. Therefore, the terminal device determines not to continue to be handed over to the first target cell any longer.

If the second CHO configuration information includes one or more of the cell identifier of the first target cell, the index corresponding to the first target cell, the measurement information (for example, the measurement frequency or the measurement identifier) corresponding to the first target cell, and the information used to identify the first target cell, and another configuration parameter that corresponds to the first target cell and that is included in the second CHO configuration information is different from another configuration parameter that corresponds to the first target cell and that is included in the first CHO configuration information, the terminal device may determine that the candidate cell configured by the network device for the terminal device by using the second CHO configuration information includes the first target cell, and the configuration parameter of the first target cell does not change. Correspondingly, the terminal device may determine to continue to be handed over to the first target cell. In other words, if the second CHO configuration information includes the CHO configuration information corresponding to the configured first target cell, it may be considered that a candidate cell subsequently configured by the network device for the terminal device still includes the first target cell, and the configuration parameter corresponding to the first target cell does not change. The terminal device may consider that the first target cell is still a cell suitable for the handover of the terminal device. Therefore, the terminal device may continue to be handed over to the first target cell.

For another example, the terminal device may compare CHO configuration information that corresponds to one or more candidate cells and that is included in the second CHO configuration information and CHO configuration information that corresponds to one or more candidate cells and that is included in the first CHO configuration information (CHO configuration information may include a CHO trigger condition corresponding to a candidate cell and/or related information corresponding to the candidate cell (for example, for the related information corresponding to the candidate cell, refer to the foregoing descriptions, and details are not described again)), to determine whether the first target cell changes. For example, the terminal device determines, through comparison, whether the CHO trigger condition corresponding to the first target cell changes, and/or whether the configuration parameter corresponding to the first target cell (for example, the C-RNTI allocated by the first target cell to the terminal device, and/or the random access channel (RACH) resource required for accessing the first target cell, and/or the resource information corresponding to the first target cell (for example, the physical layer configuration parameter, the MAC layer configuration parameter, the RLC layer configuration parameter, the PDCP layer configuration parameter, the SDAP layer configuration parameter, or the RRC layer configuration parameter)) changes, and further determines whether the first target cell changes. Specifically, for example, if the CHO trigger condition corresponding to the first target cell changes, or the configuration parameter corresponding to the first target cell changes, it may be determined that the first target cell changes. If the first target cell does not change, for example, the configuration parameter of the first target cell does not change, the terminal device may continue to be handed over to the first target cell. If the first target cell changes, for example, the configuration parameter of the first target cell changes, the terminal device may no longer continue to be handed over to the first target cell any longer.

In still another example, if the second CHO configuration information is the CHO full configuration information sent by the network device to the terminal device, the terminal device may determine, based on the second CHO configuration information, whether to continue to be handed over to the first target cell. The following provides more details.

In a manner, the terminal device may determine, based on whether the second CHO configuration information includes the cell identifier (for example, the CGI and/or the PCI) of the first target cell, the index corresponding to the first target cell, the measurement information (for example, the measurement frequency or the measurement identifier) corresponding to the first target cell, or other information that may be used to identify the first target cell, whether the configuration parameter corresponding to the first target cell changes. Optionally, if the second CHO configuration information does not include the cell identifier of the first target cell, the index corresponding to the first target cell, the measurement information corresponding to the first target cell, or the like, the terminal device may consider that a candidate cell configured by the network device for the terminal device currently does not include the first target cell, and may further consider that the first target cell may no longer be a cell suitable for the handover of the terminal device. Therefore, the terminal device determines not to continue to be handed over to the first target cell any longer.

Alternatively, in another manner, after receiving the second CHO configuration information, the terminal device may determine not to continue to be handed over to the first target cell, completely replace the first CHO configuration information with the second CHO configuration information (for example, the terminal device stores the second CHO configuration information, and removes the previously stored first CHO configuration information), and then determine, based on the second CHO configuration information, a cell to which the terminal device is to be handed over. The cell (namely, the third target cell) to which the terminal device is to be handed over and that is determined based on the second CHO configuration information may be a same cell as the first target cell, or may be another cell. This is not limited.

For another example, in another manner, after receiving the second CHO configuration information, the terminal device may first continue to perform a procedure of being handed over to the first target cell. When the terminal device performs the random access process with the first target cell (in other words, after the terminal device determines the first target cell but before the terminal device is successfully handed over to the first target cell), the terminal device may determine, based on the second CHO configuration information, whether the CHO trigger condition is met, for example, determine, based on the CHO trigger condition included in the second CHO configuration information, and/or information that is about a candidate cell and that is included in the second CHO configuration information, whether the candidate cell configured by using the second CHO configuration information meets the CHO trigger condition, and further determine whether to continue to be handed over to the first target cell. Specifically, when the terminal device performs the random access process with the first target cell (in other words, after the terminal device determines the first target cell but before the terminal device is successfully handed over to the first target cell), the terminal device redetermines, based on the second CHO configuration information, the cell (namely, the third target cell) to which the terminal device may be handed over. If the cell and the first target cell are a same cell, the terminal device may determine to continue to be handed over to the first target cell. In other words, the terminal device may continue the random access process that is being performed with the first target cell. If the cell is different from the first target cell, the terminal device may determine not to continue to be handed over to the first target cell any longer. Correspondingly, the terminal device may attempt to be handed over to the cell (namely, the third target cell) that is redetermined by the terminal device based on the second CHO configuration information.

In this embodiment of this disclosure, after receiving the second CHO configuration information, the terminal device may first suspend a handover to the first target cell. After the terminal device determines, based on the second CHO configuration information or based on the first CHO configuration information and the second CHO configuration information, whether the first target cell changes, the terminal device further determines whether to continue to be handed over to the first target cell. In some other embodiments, after receiving the second CHO configuration information, the terminal device may continue to perform the procedure of being handed over to the first target cell. Before the terminal device is successfully handed over to the first target cell, and after the terminal device determines, based on the second CHO configuration information or based on the first CHO configuration information and the second CHO configuration information, whether the first target cell changes, the terminal device further determines whether to continue to be handed over to the first target cell. For a manner in which the terminal device determines, based on the second CHO configuration information or based on the first CHO configuration information and the second CHO configuration information, whether the first target cell changes, refer to the foregoing descriptions. Details are not described herein again.

After the terminal device determines to continue to be handed over to the first target cell, the terminal device may continue the random access procedure with the first target cell. However, in some cases, for example, when there is obstruction of an object, rapid movement of the terminal device, rapid attenuation of channel quality, or the like, the terminal device may not be successfully handed over to the first target cell.

Optionally, if the terminal device is not successfully handed over to the first target cell, the method 300 further includes: determining, based on second CHO configuration information or based on first CHO configuration information and second CHO configuration information, a second target cell to which the terminal device may be handed over.

The second target cell is a cell that is redetermined and to which the terminal device attempts to be handed over after a handover procedure between the terminal device and the first target cell fails. The second target cell is a cell that meets the CHO trigger condition in the candidate cell configured by the network device for the terminal device. The second target cell and the first target cell may be the same or different. When a handover initiated by the terminal device to the first target cell fails, the terminal device may redetermine, based on CHO configuration information configured by the network device, the second target cell to which the terminal device may be handed over, so that the terminal device can be handed over to a proper target cell, to ensure service continuity.

There are a plurality of manners in which the terminal device determines the second target cell.

In an example, the second CHO configuration information is information used to change (for example, add/modify/remove), based on the first CHO configuration information, a configured candidate cell (for example, the candidate cell configured by using the first CHO configuration information). If the terminal device is not successfully handed over to the first target cell, the terminal device may determine, based on the first CHO configuration information and the second CHO configuration information, whether to continue to be handed over to the first target cell. Specifically, the second CHO configuration information may be used to add a new candidate cell, and/or to modify a configuration parameter of a configured candidate cell (for example, the candidate cell configured by using the first CHO configuration information), and/or to remove the configured candidate cell (for example, the candidate cell configured by using the first CHO configuration information).

Correspondingly, the terminal device changes the configuration parameter based on the first CHO configuration information and the second CHO configuration information. For example, based on the first CHO configuration information, if the second CHO configuration information is used to add a new candidate cell, the terminal device adds the new candidate cell, including adding a CHO trigger condition corresponding to the new candidate cell, adding related information of the new candidate cell, and/or the like; if the second CHO configuration information is used to modify the configuration information corresponding to the configured candidate cell (for example, the candidate cell configured by using the first CHO configuration information), the terminal device may modify a trigger condition corresponding to the configured candidate cell and/or related information of the configured candidate cell to the CHO trigger condition corresponding to the modified configured candidate cell and/or the related information of the modified configured candidate cell; if the second CHO configuration information is used to remove the configured candidate cell (for example, the candidate cell configured by using the first CHO configuration information), the terminal device may remove a CHO trigger condition corresponding to the configured candidate cell, and/or remove the related information of the configured candidate cell, and/or remove the configured measurement identifier, the measurement frequency, or the like that corresponds to the configured candidate cell. In other words, if the terminal device is not successfully handed over to the first target cell, the terminal device may determine latest CHO configuration information (namely, updated CHO configuration information) based on the first CHO configuration information and the second CHO configuration information, and the terminal device determines the second target cell based on the latest CHO configuration information.

In another example, the second CHO configuration information is the CHO full configuration information sent by the network device to the terminal device. Because the second CHO configuration information and the first CHO configuration information are decoupled from and independent of each other, if the terminal device is not successfully handed over to the first target cell, the terminal device may determine the second target cell based on the second CHO configuration information. The terminal device may determine, based on the second CHO configuration information, whether the CHO trigger condition is met. For example, the terminal device determines, based on a CHO trigger condition included in the second CHO configuration information and/or information that is about the candidate cell and that is included in the second CHO configuration information, whether the CHO trigger condition is met, to determine the second target cell from the candidate cell configured by using the second CHO configuration information.

As described above, if the first target cell changes, for example, when the CHO configuration parameter corresponding to the first target cell changes, the terminal device may determine, based on the second CHO configuration information or based on the first CHO configuration information and the second CHO configuration information, the third target cell to which the terminal device may be handed over.

The third target cell is a cell that is redetermined by the terminal device and to which the terminal device is to be handed over when the CHO configuration parameter corresponding to the first target cell changes, and the third target cell may be a cell that meets the CHO trigger condition in the candidate cell configured by the network device for the terminal device. The third target cell and the first target cell may be the same or different.

There are a plurality of manners in which the terminal device determines the third target cell. A manner in which the terminal device determines the third target cell is the same as a manner in which the terminal device determines the second target cell, and is only briefly described below. For detailed content, refer to the foregoing descriptions of determining the second target cell.

In an example, the second CHO configuration information is information used to change (for example, add/modify/remove), based on the first CHO configuration information, the configured candidate cell (for example, the candidate cell configured by using the first CHO configuration information), the terminal device may determine the third target cell based on the first CHO configuration information and the second CHO configuration information. Specifically, the second CHO configuration information may be used to add a new candidate cell, and/or to modify a configuration parameter of a configured candidate cell (for example, the candidate cell configured by using the first CHO configuration information), and/or to remove the configured candidate cell (for example, the candidate cell configured by using the first CHO configuration information).

Correspondingly, the terminal device changes the configuration parameter based on the first CHO configuration information and the second CHO configuration information. In other words, the terminal device may determine the latest CHO configuration information (namely, the updated CHO configuration information) based on the first CHO configuration information and the second CHO configuration information, and the terminal device determines the third target cell based on the latest CHO configuration information.

In another example, the second CHO configuration information is the CHO full configuration information sent by the network device to the terminal device. Because the second CHO configuration information and the first CHO configuration information are decoupled from and independent of each other, the terminal device may determine the third target cell based on the second CHO configuration information. The terminal device may determine, based on the second CHO configuration information, whether the CHO trigger condition is met. For example, the terminal device determines, based on the CHO trigger condition included in the second CHO configuration information and/or information that is about the candidate cell and that is included in the second CHO configuration information, whether the CHO trigger condition is met, to determine the third target cell from the candidate cell configured by using the second CHO configuration information.

Optionally, the first CHO configuration information and/or the second CHO configuration information may be carried in the radio resource control (RRC) message. In other words, the network device sends the first CHO configuration information and/or the second CHO configuration information to the terminal device by using the RRC message. The RRC message may be an existing RRC message, for example, an RRC reconfiguration message, or may be a newly defined RRC message. This is not specifically limited in this embodiment of this disclosure.

Figure 4:
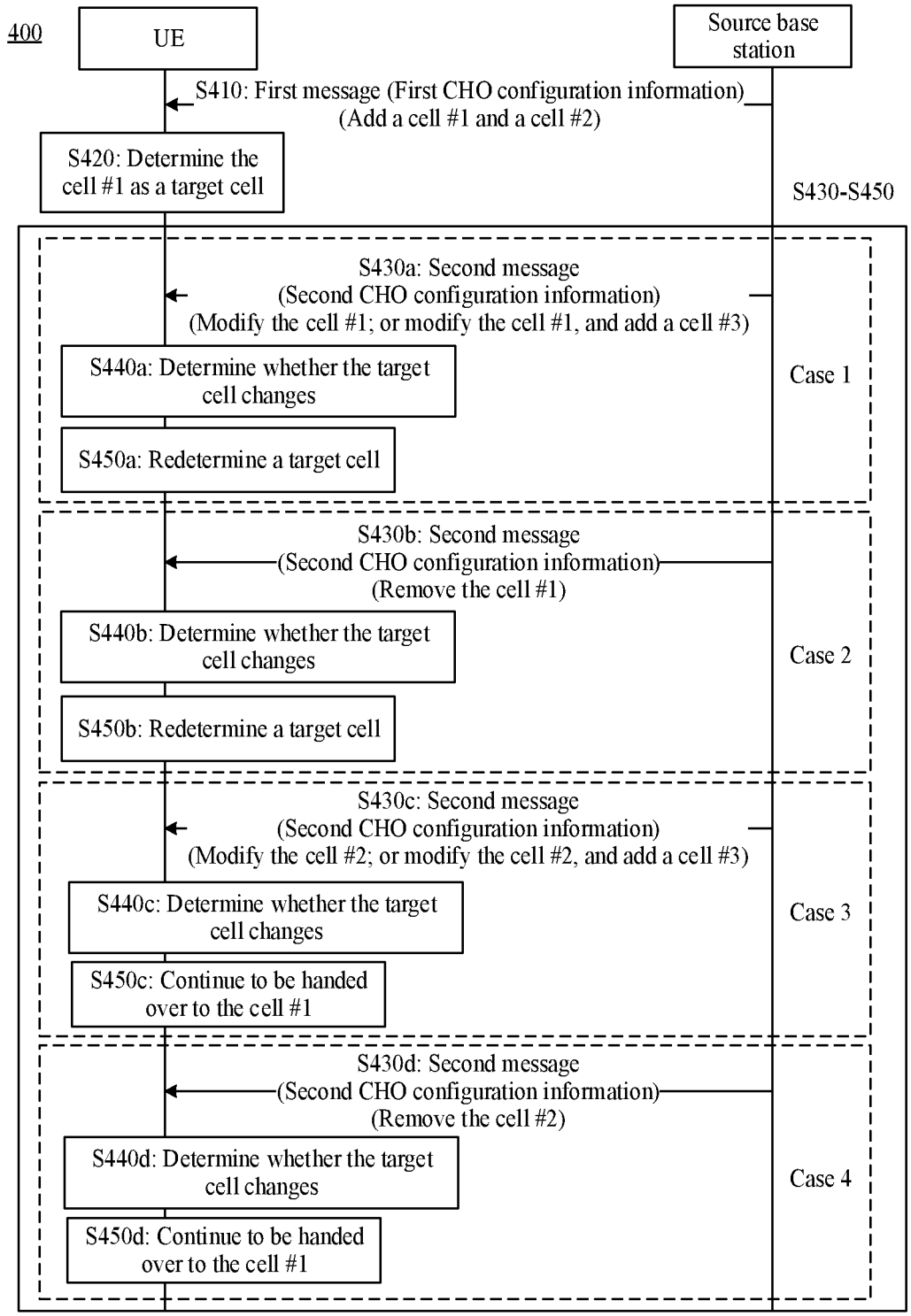
FIG. 4 is a schematic flowchart of a handover method according to another embodiment of this disclosure.

With reference to FIG. 4, the following describes in more detail some specific non-limiting examples of the embodiments of this disclosure. In FIG. 4, that a source network device is a source base station and a terminal device is UE is used as an example for description. The method 400 may include step S410 to step S450.

It should be noted that, to avoid signaling overheads, in a CHO mechanism, it is assumed that a maximum quantity of candidate cells that may be configured by a network device for the terminal device is N, where N is a positive integer. For ease of understanding, in this embodiment of this disclosure, that N is greater than 3 and the network device configures two candidate cells (a cell #1 and a cell #2) for the terminal device for the first time is used as an example. It should be understood that a quantity x of candidate cells finally configured by the network device for the terminal device needs to be greater than or equal to 1 and less than or equal to N.

In step S410, the source base station sends a first message to the UE. The first message includes first CHO configuration information configured by the network device for the terminal device, and the first CHO configuration information includes CHO configuration information corresponding to each candidate cell configured by the network device for the terminal device. The CHO configuration information corresponding to the candidate cell may include a CHO trigger condition corresponding to the candidate cell and/or related information corresponding to the candidate cell (for example, the related information corresponding to the candidate cell includes at least one of a cell identifier of the candidate cell, frequency information corresponding to the candidate cell, a C-RNTI allocated by the candidate cell to the terminal device, and random access channel (RACH) resource information required for accessing the candidate cell), resource information corresponding to the candidate cell (for example, a physical layer configuration parameter, a MAC layer configuration parameter, an RLC layer configuration parameter, a PDCP layer configuration parameter, an SDAP layer configuration parameter, or an RRC layer configuration parameter), or the like.

FIG. 4 shows an example of two candidate cells, namely, the cell #1 (a cell 1) and the cell #2 (a cell 2). The first message includes CHO configuration information corresponding to the cell 1 and CHO configuration information corresponding to the cell 2. In other words, the first CHO configuration information includes the CHO configuration information corresponding to the cell 1 and the CHO configuration information corresponding to the cell 2.

The first message may be an RRC message. Specifically, an existing RRC message, for example, an RRC reconfiguration message may be reused as the first message. The first message may include an information element used to add or modify related CHO configuration information of one candidate cell/some candidate cells, for example, an addition/modification list (ToAddModList) information element. Alternatively, the first message may be a newly defined RRC message. For example, the first message is a conditional radio resource control reconfiguration (CondRRCReconfiguration) message, or another naming/expression form. This is not specifically limited in this embodiment of this disclosure.

In an example, that the first message is a newly defined RRC message (for example, the CondRRCReconfiguration message) is used as an example for description. The first message may include a reconfiguration addition/modification list (cond reconfiguration to add mod list or CondReconfigurationToAddModList) information element, and is used to add and modify CHO configuration information of a corresponding candidate cell. Further, the reconfiguration addition/modification list information element includes a reconfiguration (cond reconfiguration or CondReconfiguration) information element corresponding to the cell 1 and a reconfiguration (cond reconfiguration or CondReconfiguration) information element corresponding to the cell 2. The CondReconfiguration information element corresponding to the cell 1 carries the CHO configuration information corresponding to the cell 1, and the CondReconfiguration information element corresponding to the cell 2 carries the CHO configuration information corresponding to the cell 2. In other words, a CondReconfiguration information element may be used to carry CHO configuration information, and the CHO configuration information corresponding to each candidate cell may be carried in a CondReconfiguration information element corresponding to each candidate cell.

By way of example instead of limitation, the newly defined RRC message (for example, the CondRRCReconfiguration message) may be in the following message structure/ASN.1 encoding form, but it should be understood that the following message structure form is also applicable to a first message in another form.

```
-- ASN1START
CondRRCReconfiguration ::=          SEQUENCE {
    rrc-TransactionIdentifier           RRC-TransactionIdentifier,
    criticalExtensions                   CHOICE {
       c1                                   CHOICE{
          condRRCReconfiguration-r16        CondRRCReconfiguration-r16-IEs,
       },
       criticalExtensionsFuture          SEQUENCE { }
    }
 }
    CondRRCReconfiguration-r16-IEs ::= SEQUENCE {
       condReconfigurationToAddModList           CondReconfigurationToAddModList
OPTIONAL,
       condReconfigurationToRemoveList
CondReconfigurationToRemoveList    OPTIONAL,    nonCriticalExtension
SEQUENCE { }                        OPTIONAL
    }
    CondReconfigurationToAddModList ::= SEQUENCE (SIZE (1..maxCellCond)) OF
CondReconfiguration
    CondReconfigurationToRemoveList ::= SEQUENCE (SIZE (1..maxCellCond)) OF
CellIndex
-- ASN1STOP
```

In step S420, the UE determines, based on the first message, that the cell #1 is a target cell. The target cell is a cell to which the terminal device is to be handed over.

In this embodiment of this disclosure, the target cell (namely, the cell #1) may be, for example, a cell with highest cell signal quality in a plurality of candidate cells that meet a CHO trigger condition, or a cell with a highest priority (for example, a highest frequency priority) in a plurality of candidate cells that meet a CHO trigger condition, or a cell with a largest quantity of excellent beams (the excellent beam is a beam whose signal quality is higher than a predetermined threshold, the predetermined threshold may be included in the first message or may be agreed in a protocol, and this is not limited in this disclosure) in a plurality of candidate cells that meet a CHO trigger condition, or any cell in a plurality of candidate cells that meet a CHO trigger condition, or a cell that meets another condition. This is not limited in this embodiment.

In step S430, after the UE selects the cell #1 as the target cell, the UE attempts to access the cell #1. When the UE attempts to access the cell #1, the UE receives a second message sent by the source base station. The second message includes second CHO configuration information.

A process in which the UE attempts to access the cell 1 includes at least one of a process that is initiated prior to the UE sending a preamble to the cell 1 and a process in which the UE performs a RACH process with the cell 1. For example, the process in which the UE attempts to access the cell 1 may include: a process before the UE sends the preamble to the cell 1; and/or a process after the UE sends the preamble to the cell 1 and before the UE receives a random access response (RAR); and/or a process after the UE receives the RAR and before the UE sends an RRC reconfiguration complete message to the cell 1; and/or a process after the UE sends the preamble to the cell 1 and before the UE sends the RRC reconfiguration complete message to the cell 1. Alternatively, when the UE does not perform a random access procedure with the cell 1 after determining the cell 1, optionally, the process in which the UE attempts to access the cell 1 includes a process before the UE sends the RRC reconfiguration complete message to the cell 1.

The second message may be an RRC message. Specifically, the existing RRC message, for example, the RRC reconfiguration message may be reused as the second message. The second message may include an information element used to add or modify related CHO configuration information of one candidate cell/some candidate cells, for example, the ToAddModList information element; and/or the second message may include an information element used to remove the related CHO configuration information of one candidate cell/some candidate cells, for example, a ToRemoveList information element. Alternatively, the second message may be a newly defined RRC message. For example, the second message is a CondRRCReconfiguration message or in another naming/expression form. This is not specifically limited in this embodiment of this disclosure.

For ease of understanding, in this embodiment of this disclosure, that the network device separately sends the first CHO configuration information and the second CHO configuration information to the terminal device by using the RRC message (for example, the existing RRC message or the newly defined RRC message) is only used as an example for description. The first CHO configuration information and the second CHO configuration information may be carried by using the ToAddModList information element and/or the ToRemoveList information element. In another embodiment, the network device may further provide CHO configuration information for the terminal device by using another message, a resource, or another manner, and a method in which the UE performs processing based on the configuration information (for example, steps S440 and steps S450 in FIG. 4) this embodiment of this disclosure is also applicable.

For ease of understanding, in this embodiment of this disclosure, that the second CHO configuration information is information used to change (for example, add/modify/remove), based on the first CHO configuration information, a configured candidate cell (for example, a candidate cell configured by using the first CHO configuration information) is used as an example for description. For example, the second CHO configuration information may be used to add a new candidate cell, and/or to modify a configuration parameter of the configured candidate cell (for example, the candidate cell configured by using the first CHO configuration information), and/or to remove the configured candidate cell (for example, the candidate cell configured by using the first CHO configuration information). The following discusses four cases.

Case 1

In step S430a, the source base station sends, to the UE, the second message carrying the second CHO configuration information. The second CHO configuration information includes the CHO configuration information corresponding to the cell 1. In other words, the second CHO configuration information is used to modify the CHO configuration information corresponding to the candidate cell, namely, the cell 1, configured by using the first CHO configuration information.

In an example, that the second message is a newly defined RRC message (for example, the CondRRCReconfiguration message) is used as an example for description. Specifically, the second message may include the CondReconfigurationToAddModList information element.

Further, the CondReconfigurationToAddModList information element includes the CondReconfiguration information element corresponding to the cell 1. The CondReconfiguration information element corresponding to the cell 1 carries modified CHO configuration information corresponding to the cell 1.

Optionally, the second CHO configuration information may further include CHO configuration information corresponding to a newly added candidate cell. For ease of understanding, in this embodiment of this disclosure, that the newly added candidate cell is a cell 3 is used as an example. The second CHO configuration information is not only used to modify the CHO configuration information corresponding to the cell 1 configured by using the first CHO configuration information, but also used to add CHO configuration information corresponding to the cell 3. In other words, in addition to modifying the CHO configuration information corresponding to the cell 1, the network device needs to add another cell and use the another cell as a candidate cell for a CHO.

Specifically, the second message may include the CondReconfigurationToAddModList information element. Further, in addition to the CondReconfiguration information element corresponding to the cell 1, the CondReconfigurationToAddModList information element includes a CondReconfiguration information element corresponding to the cell 3. The CondReconfiguration information element corresponding to the cell 1 carries the modified CHO configuration information corresponding to the cell 1, and the CondReconfiguration information element corresponding to the cell 3 carries the CHO configuration information corresponding to the newly added candidate cell 3.

In step S440a, the UE determines whether the target cell changes.

After receiving the second CHO configuration information, the UE determines, based on the second CHO configuration information, whether the target cell, namely, the cell 1, determined in step S420 changes. For example, the UE determines whether the CHO configuration information corresponding to the cell 1 changes, and further determines whether to continue to be handed over to the cell 1. Specifically, for a method for determining whether the CHO configuration information corresponding to the cell 1 changes, refer to the foregoing manners of "determining whether a CHO configuration parameter corresponding to a first target cell changes". Details are not described herein again. Specifically, for example, the UE determines, based on the second CHO configuration information, that the cell 1 changes.

In step S450a, after the UE determines that the target cell changes, the UE determines not to continue to access the cell 1 any longer, the UE updates the CHO configuration information based on the first CHO configuration information and the second CHO configuration information, the UE may store the updated CHO configuration information, and the UE redetermines, based on the updated CHO configuration information, whether the CHO trigger condition is met, to determine the target cell.

That the UE does not continue to access the cell 1 any longer includes: If the UE has not sent the preamble to the cell 1, the UE does not send the preamble to the cell 1; or if the UE is performing the RACH procedure with the cell 1, the UE stops the RACH process that is being performed with the cell 1. Specifically, if the UE has not sent the preamble to the cell 1, the UE does not send the preamble to the cell 1; if the UE has sent the preamble to the cell 1 but is waiting to receive the random access response (RAR), the UE no longer receives the RAR; if the UE has received the RAR but has not sent the RRC reconfiguration complete message to the cell 1, the UE does not send the RRC reconfiguration complete message to the cell 1; or if the UE does not perform the random access procedure (namely, a RACH-less handover) with the cell 1 after the UE determines the cell 1, the UE stops the RACH procedure that is being performed with the cell 1, including: After the UE determines the cell 1, the UE does not send the RRC reconfiguration complete message to the cell 1.

That the UE updates the CHO configuration information based on the first CHO configuration information and the second CHO configuration information includes: The UE modifies/updates the configured candidate cell based on the first CHO configuration information and the second CHO configuration information, for example, modifies/updates the CHO configuration information corresponding to the cell 1. Alternatively, the UE adds a new candidate cell based on the first CHO configuration information and the second CHO configuration information. For example, in addition to updating the CHO configuration information corresponding to the cell 1, the network device further provides the CHO configuration information corresponding to the cell 3. Therefore, in addition to modifying the CHO configuration information corresponding to the cell 1, the UE adds the cell 3 and uses the cell 3 as a candidate cell, in other words, adds the CHO configuration information corresponding to the cell 3, and stores the CHO configuration information corresponding to the cell 3.

The UE stops the random access process with the cell 1 based on the updated CHO configuration information, and the UE may search for another target cell that meets the CHO trigger condition. A target cell that is redetermined by the UE may still be the cell 1, or may be another cell that meets the CHO trigger condition in the candidate cell and that is different from the cell 1.

Case 2

In step S430b, the source base station sends, to the UE, the second message carrying the second CHO configuration information. The second message is used to remove the cell 1 (or used to remove the CHO configuration information corresponding to the cell 1). Optionally, the second CHO configuration information includes any one or more of a cell index corresponding to the cell 1, a cell identifier (for example, a CGI and/or a PCI) corresponding to the cell 1, measurement information (for example, a measurement frequency or a measurement identifier) corresponding to the cell 1, CHO configuration information corresponding to the cell 1, or other information that may be used to identify the cell 1.

In an example, that the second message is a newly defined RRC message (for example, the CondRRCReconfiguration message) is used as an example for description. Specifically, the second message may include a reconfiguration removal list (cond reconfiguration to remove list or CondReconfigurationToRemoveList) information element. Further, the reconfiguration removal list information element includes any one or more of the cell index corresponding to the cell 1, the cell identifier corresponding to the cell 1, the measurement information corresponding to the cell 1, the CHO configuration information corresponding to the cell 1, or the other information that may be used to identify the cell 1.

The cell index (cellIndex) corresponding to the cell 1 may be provided by the network device when the network device provides the UE with the CHO configuration information corresponding to the cell 1. For example, the first message may include the cell index corresponding to the cell 1. The cell index corresponding to the cell 1 may alternatively be determined according to a preset rule. For example, the cell index is determined based on an initial configuration sequence. In the first message, a cell index corresponding to the $1^{st}$ configured cell is 1, and a cell index corresponding to the $2^{nd}$ configured cell is 2, and so on.

The cell identifier corresponding to the cell 1 may include the PCI of the cell 1 and/or the CGI of the cell 1, and the cell identifier corresponding to the cell 1 may further include frequency information corresponding to the cell 1.

The measurement information corresponding to the cell 1 may include a measurement identifier (MeasID) and/or a measurement frequency (MeasObject). The measurement identifier and the measurement frequency may be provided by the network device when the network device provides the UE with the CHO configuration information. Each candidate cell has a measurement identifier and a measurement frequency that correspond to the candidate cell. In other words, the candidate cell is in a one-to-one correspondence with the measurement identifier/measurement frequency. Optionally, the measurement information corresponding to the cell 1 may further include reporting configuration information (for example, ReportConfig).

Optionally, the second CHO configuration information may further include a cell index, a cell identifier, measurement information, or CHO configuration information that corresponds to another candidate cell different from the cell 1, or other information that may be used to identify the candidate cell. In other words, the second CHO configuration information may not only be used to remove the CHO configuration information corresponding to the cell 1, but also be used to remove CHO configuration information corresponding to another configured candidate cell different from the cell 1.

In step S440b, the UE determines whether the target cell changes.

After receiving the second CHO configuration information, the UE determines, based on the second CHO configuration information, whether the target cell, namely, the cell 1, determined in step S420 changes. For example, the UE determines whether the CHO configuration information corresponding to the cell 1 changes, and further determines whether to continue to be handed over to the cell 1. Specifically, for a method for determining whether the CHO configuration information corresponding to the cell 1 changes, refer to the foregoing manners of "determining whether a CHO configuration parameter corresponding to a first target cell changes". Details are not described again. Specifically, for example, the UE determines, based on the second CHO configuration information, to remove the cell 1. In other words, the UE determines, based on the second CHO configuration information, that the cell 1 changes.

In step S450b, after the UE determines that the target cell changes, the UE determines not to continue to access the cell 1 any longer, the UE updates the CHO configuration information based on the first CHO configuration information and the second CHO configuration information, the UE may store the updated CHO configuration information, and the UE redetermines, based on the updated CHO configuration information, whether the CHO trigger condition is met, to determine the target cell.

That the UE does not continue to access the cell 1 any longer includes: If the UE has not sent the preamble to the cell 1, the UE does not send the preamble to the cell 1; or if the UE is performing the RACH procedure with the cell 1, the UE stops the RACH process with the cell 1. Specifically, for a specific manner of "the UE stops the RACH process that is being performed with the cell 1", refer to related descriptions in step S450a. Details are not described again.

That the UE updates the CHO configuration information based on the first CHO configuration information and the second CHO configuration information includes: The UE removes the configured candidate cell based on the first CHO configuration information and the second CHO configuration information, for example, removes the cell 1 (alternatively, the UE removes the CHO configuration information corresponding to the cell 1, in other words, the UE removes, from CHO configuration information stored in the UE, the CHO configuration information corresponding to the cell 1). If the CondReconfigurationToRemoveList information element further includes the cell index, the cell identifier, the measurement information, or the CHO configuration information that corresponds to the another candidate cell different from the cell 1, or the other information that may be used to identify the candidate cell, in addition to the cell 1, the UE removes another candidate cell indicated by the CondReconfigurationToRemoveList information element (or removes CHO configuration information corresponding to the another candidate cell indicated by the CondReconfigurationToRemoveList information element). It should be understood that, that the UE removes CHO configuration information corresponding to a cell (for example, the cell 1) may be understood as follows: The UE excludes the cell (for example, the cell 1) from a candidate cell list for a CHO. In other words, the UE no longer determines whether the cell meets the CHO trigger condition; or the UE no longer attempts to access the cell.

The UE stops the random access process with the cell 1 based on the updated CHO configuration information, and the UE may search for another target cell that meets the CHO trigger condition. A target cell that is redetermined by the UE may be another cell that meets the CHO trigger condition in the candidate cell and that is different from the cell 1.

Case 3

In step S430c, the source base station sends, to the UE, the second message carrying the second CHO configuration information. The second CHO configuration information includes the CHO configuration information corresponding to the cell 2. In other words, the second CHO configuration information is used to modify the CHO configuration information corresponding to the candidate cell, namely, the cell 2, configured by using the first CHO configuration information.

In an example, that the second message is a newly defined RRC message (for example, the CondRRCReconfiguration message) is used as an example for description. Specifically, the second message may include the CondReconfigurationToAddModList information element. Further, the CondReconfigurationToAddModList information element includes the CondReconfiguration information element corresponding to the cell 2. The CondReconfiguration information element corresponding to the cell 2 carries modified CHO configuration information corresponding to the cell 2.

Optionally, the second CHO configuration information may further include CHO configuration information corresponding to a newly added candidate cell. For ease of understanding, in this embodiment of this disclosure, that the newly added candidate cell is a cell 3 is used as an example. The second CHO configuration information is not only used to modify the CHO configuration information corresponding to the cell 2 configured by using the first CHO configuration information, but also used to add CHO configuration information corresponding to the cell 3. In other words, in addition to modifying the CHO configuration information corresponding to the cell 2, the network device needs to add another cell and use the another cell as a candidate cell for a CHO.

Specifically, the second message may include the CondReconfigurationToAddModList information element. Further, in addition to the CondReconfiguration information element corresponding to the cell 2, the CondReconfigurationToAddModList information element includes a CondReconfiguration information element corresponding to the cell 3. The CondReconfiguration information element corresponding to the cell 2 carries the modified CHO configuration information corresponding to the cell 2, and the CondReconfiguration information element corresponding to the cell 3 carries the CHO configuration information corresponding to the newly added candidate cell 3.

In step S440c, the UE determines whether the target cell changes.

After receiving the second CHO configuration information, the UE determines, based on the second CHO configuration information, whether the target cell, namely, the cell 1, determined in step S420 changes. For example, the UE determines whether the CHO configuration information corresponding to the cell 1 changes, and further determines whether to continue to be handed over to the cell 1. Specifically, for a method for determining whether the CHO configuration information corresponding to the cell 1 changes, refer to the foregoing manners of "determining whether a CHO configuration parameter corresponding to a first target cell changes". Details are not described again. Specifically, for example, the UE determines, based on the second CHO configuration information, that the cell 1 does not change.

In step S450c, after the UE determines that the target cell does not change, the UE continues to be handed over to the cell #1 (namely, the cell 1). The UE updates the CHO configuration information based on the first CHO configuration information and the second CHO configuration information, and the UE may store the updated CHO configuration information.

That the UE continues to be handed over to the cell 1 includes: If the UE has not sent the preamble to the cell 1, the UE sends the preamble to the cell 1; or if the UE is performing the RACH procedure with the cell 1, the UE continues to perform the RACH procedure with the cell 1. Specifically, if the UE has sent the preamble to the cell 1, the UE waits to receive the random access response (RAR); or if the UE has received the RAR, the UE sends the RRC reconfiguration complete message to the cell 1. In a case of a RACH-less handover (the UE does not perform the random access procedure with the cell 1 after determining the cell 1), the UE continues to be handed over to the cell 1, including: The UE sends the RRC reconfiguration complete message to the cell 1.

That the UE updates the CHO configuration information based on the first CHO configuration information and the second CHO configuration information includes: The UE may modify the CHO configuration information corresponding to the configured candidate cell, for example, modify the CHO configuration information corresponding to the cell 2, and/or the UE adds a new candidate cell. For example, if the network device further provides the CHO configuration information corresponding to the cell 3, the UE adds the cell 3 and uses the cell 3 as a candidate cell, in other words, adds the CHO configuration information corresponding to the cell 3, and stores the CHO configuration information corresponding to the cell 3.

Optionally, if the UE successfully accesses the cell 1 (in other words, the UE is successfully handed over to the cell 1), the UE may release stored CHO configuration information corresponding to all other candidate cells different from the target cell (namely, the cell 1).

Optionally, if the UE does not successfully access the cell 1 (in other words, the UE is not successfully handed over to the cell 1), the UE redetermines the target cell based on the updated CHO configuration information.

Case 4

In step S430d, the source base station sends, to the UE, the second message carrying the second CHO configuration information. The second message is used to remove the cell 2 (or used to remove the CHO configuration information corresponding to the cell 2). Optionally, the second CHO configuration information includes any one or more of a cell index corresponding to the cell 2, a cell identifier (for example, a CGI and/or a PCI) corresponding to the cell 2, measurement information (for example, a measurement frequency or a measurement identifier) corresponding to the cell 2, CHO configuration information corresponding to the cell 2, or other information that may be used to identify the cell 2.

In an example, that the second message is a newly defined RRC message (for example, the CondRRCReconfiguration message) is used as an example for description. Specifically, the second message may include a reconfiguration removal list (cond reconfiguration to remove list or CondReconfigurationToRemoveList) information element. Further, the reconfiguration removal list information element includes any one or more of the cell index corresponding to the cell 2, the cell identifier corresponding to the cell 2, the measurement information corresponding to the cell 2, the CHO configuration information corresponding to the cell 2, or the other information that may be used to identify the cell 2.

The cell index (cellIndex) corresponding to the cell 2 may be provided by the network device when the network device provides the UE with the CHO configuration information corresponding to the cell 2. For example, the first message may include the cell index corresponding to the cell 2. The cell index corresponding to the cell 2 may alternatively be determined according to a preset rule. For example, the cell index is determined based on an initial configuration sequence. In the first message, a cell index corresponding to the 1$^{st}$ configured cell is 1, and a cell index corresponding to the 2$^{nd}$ configured cell is 2, and so on.

The cell identifier corresponding to the cell 2 may include the PCI of the cell 2 and/or the CGI of the cell 2, and the cell identifier corresponding to the cell 2 may further include the frequency information corresponding to the cell 2.

The measurement information corresponding to the cell 2 may include a measurement identifier (measure identification, MeasID) and/or a measurement frequency (measure object, MeasObject). The measurement identifier and the measurement frequency may be provided by the network device when the network device provides the UE with the CHO configuration information. Each candidate cell has a measurement identifier and a measurement frequency that correspond to the candidate cell. In other words, the candidate cell is in a one-to-one correspondence with the measurement identifier/measurement frequency. Optionally, the measurement information corresponding to the cell 2 may further include reporting configuration information (for example, ReportConfig).

Optionally, the second CHO configuration information may further include a cell index, a cell identifier, measurement information, or CHO configuration information that corresponds to another candidate cell different from the cell 2, or other information that may be used to identify the candidate cell. In other words, the second CHO configuration information may not only be used to remove the CHO configuration information corresponding to the cell 2, but also be used to remove CHO configuration information corresponding to the another configured candidate cell different from the cell 2.

In step S440d, the UE determines whether the target cell changes.

After receiving the second CHO configuration information, the UE determines, based on the second CHO configuration information, whether the target cell, namely, the cell 1, determined in step S420 changes. For example, the UE determines whether the CHO configuration information corresponding to the cell 1 changes, and further determines whether to continue to be handed over to the cell 1. Specifically, for a method for determining whether the CHO configuration information corresponding to the cell 1 changes, refer to the foregoing manners of "determining whether a CHO configuration parameter corresponding to a first target cell changes". Details are not described again. Specifically, for example, the UE determines, based on the second CHO configuration information, that the cell 1 does not change.

In step S450d, after the UE determines that the target cell does not change, the UE continues to be handed over to the cell #1 (namely, the cell 1). The UE updates the CHO configuration information based on the first CHO configuration information and the second CHO configuration information, and the UE may store the updated CHO configuration information.

For a specific manner of "the UE continues to be handed over to the cell 1", refer to related descriptions in step S450c. Details are not described again. That the UE updates the CHO configuration information based on the first CHO configuration information and the second CHO configuration information includes: The UE removes the configured candidate cell based on the first CHO configuration information and the second CHO configuration information, for example, removes the cell 2 (alternatively, the UE removes the CHO configuration information corresponding to the cell 1, in other words, the UE removes, from CHO configuration information stored in the UE, the CHO configuration information corresponding to the cell 1). If a CondReconfigurationToRemoveList information element further includes a cell index, a cell identifier, measurement information, or CHO configuration information that corresponds to another candidate cell different from the cell 1 and the cell 2, or other information that may be used to identify the candidate cell, in addition to the cell 2, the UE removes another candidate cell indicated by the CondReconfigurationToRemoveList information element (or removes CHO configuration information corresponding to the another candidate cell indicated by the CondReconfigurationToRemoveList information element). It should be understood that, that the UE removes CHO configuration information corresponding to a cell (for example, the cell 2) may be understood as follows: The UE excludes the cell (for example, the cell 2) from a candidate cell list for a CHO. In other words, the UE no longer determines whether the cell meets the CHO trigger condition; or the UE no longer attempts to access the cell.

Optionally, if the UE successfully accesses the cell 1 (in other words, the UE is successfully handed over to the cell 1), the UE may release stored CHO configuration information corresponding to all other candidate cells different from the target cell (namely, the cell 1).

Optionally, if the UE does not successfully access the cell 1 (in other words, the UE is not successfully handed over to the cell 1), the UE redetermines the target cell based on the updated CHO configuration information.

It should be noted that, the second CHO configuration information may be carried in an information element. In some embodiments, modified CHO configuration information corresponding to a candidate cell and CHO configuration information corresponding to an added candidate cell that are included in the second CHO configuration information may be carried in a same information element. For example, in the CondReconfigurationToAddModList information element, information that is used to remove the CHO configuration information corresponding to the candidate cell and that is included in the second CHO configuration information may be carried in another information element, for example, in the CondReconfigurationToRemoveList information element. In some other embodiments, the modified CHO configuration information corresponding to the candidate cell, the CHO configuration information corresponding to the added candidate cell, and the information used to remove the CHO configuration information corresponding to the candidate cell that are included in the second CHO configuration information may be respectively carried in different information elements. For example, the modified CHO configuration information corresponding to the candidate cell may be carried in a reconfiguration modification list (CondReconfigurationToModList) information element, the CHO configuration information corresponding to the added candidate cell is carried in a reconfiguration addition list (CondReconfigurationToAddList) information element, and the information used to remove the CHO configuration information corresponding to the candidate cell is carried in the reconfiguration removal list (CondReconfigurationToRemoveList) information element. This is not specifically limited in this embodiment of this disclosure. A specific information element configuration form may be determined in a network based on a requirement.

In this embodiment of this disclosure, in an example, in a process in which the UE attempts to access the determined target cell (for example, before the UE sends the preamble to the target cell or in a process in which the UE performs RACH with the target cell), if a network side modifies/removes a related configuration of the target cell, the UE stops the RACH procedure with the target cell, and modifies/removes CHO configuration information corresponding to the target cell. The UE performs, based on the updated CHO configuration information, a subsequent operation such as selecting a new target cell and accessing a new target cell. In another example, in the process in which the UE attempts to access the determined target cell (for example, before the UE sends the preamble to the target cell or in the process in which the UE performs RACH with the target cell), if the network side modifies/removes CHO configuration information corresponding to another candidate cell (a non-target cell), the UE may continue the RACH procedure with the target cell, and modify/remove the CHO configuration information corresponding to the another candidate cell. In the technical solution provided in this embodiment of this disclosure, the UE may perform correct processing based on CHO configuration information sent in a network, so that the UE and the network side have same understanding/behavior, conditional handover reliability is improved, and system performance is improved.

It may be understood that, in the foregoing method embodiments, an operation implemented by the terminal device may also be implemented by a component (for example, a chip or a circuit) that may be configured in the terminal device, and an operation implemented by the network device may also be implemented by a component (for example, a chip or a circuit) that may be configured in the network device.

Figure 5:
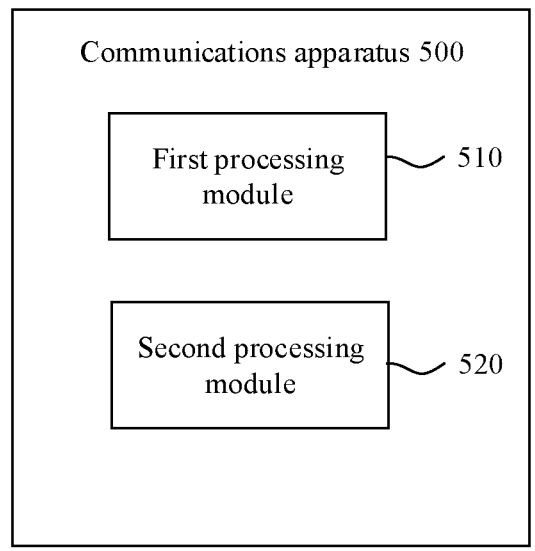
FIG. 5 is a schematic diagram of a structure of a communications apparatus according to an embodiment of this disclosure.
Figure 6:
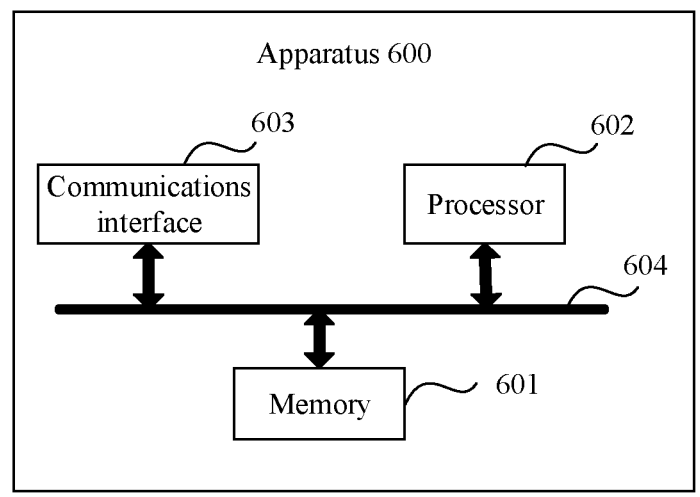
FIG. 6 is a schematic diagram of a structure of an apparatus according to an embodiment of this disclosure.

The foregoing describes the method embodiments in the embodiments of this disclosure in detail above with reference to FIG. 1 to FIG. 4, and the following describes in detail apparatus embodiments of this disclosure with reference to FIG. 5 to FIG. 6. It should be understood that descriptions of the method embodiments correspond to descriptions of the apparatus embodiments. Therefore, for a part not described in detail, refer to the foregoing method embodiments.

FIG. 5 is a schematic diagram of a structure of a communications apparatus according to an embodiment of this disclosure. A communications apparatus 500 in FIG. 5 may be a specific example of the terminal device 120 in FIG. 1. The communications apparatus 500 shown in FIG. 5 may be configured to perform the method in FIG. 3, and may specifically implement the embodiment shown in FIG. 4. To avoid redundancy, details are not described again.

The communications apparatus 500 shown in FIG. 5 includes a first processing module 510 and a second processing module 520.

The first processing module 510 is configured to determine a first target cell based on first conditional handover (CHO) configuration information. The first target cell is a cell to which a terminal device is to be handed over.

The second processing module 520 is configured to: in a process of attempting to access the first target cell, if receiving second CHO configuration information, determine, based on the second CHO configuration information, whether to continue to be handed over to the first target cell. The process of attempting to access the first target cell includes: a process before sending a preamble to the first target cell; and/or a process of performing random access (RACH) to the first target cell.

Optionally, the second processing module 520 is configured to: determine, based on the second CHO configuration information, that a CHO configuration parameter corresponding to the first target cell does not change, and determine to continue to be handed over to the first target cell.

Optionally, if the communications apparatus 500 is not successfully handed over to the first target cell, the first processing module 510 is further configured to: determine, based on the second CHO configuration information or based on the first CHO configuration information and the second CHO configuration information, a second target cell to which the communications apparatus 500 is to be handed over.

Optionally, the second processing module 520 is disclosure configured to: determine, based on the second CHO configuration information, that the CHO configuration parameter corresponding to the first target cell changes, and determine, based on the second CHO configuration information or based on the first CHO configuration information and the second CHO configuration information, a third target cell to which the communications apparatus 500 is to be handed over.

Optionally, the first processing module 510 may also perform an action or an operation performed by the second processing module 520, and the second processing module 520 may also perform an action or an operation performed by the first processing module 510.

Optionally, the first CHO configuration information and/or the second CHO configuration information are/is carried in a radio resource control (RRC) message.

Optionally, the communications apparatus 500 further includes a receiving module, and the receiving module is configured to receive the first CHO configuration information and/or the second CHO configuration information.

Optionally, the communications apparatus 500 further includes a storage module, and the storage module is configured to store program instructions and/or data.

Optionally, the first processing module 510 and the second processing module 520 may be implemented by using a processor. The receiving module may be a communications interface, and the communications interface may be a transceiver, a circuit, a bus, a module, a pin, or another type of communications interface. The storage module may be a memory. The modules may be separated from each other, or the modules may be coupled or integrated.

FIG. 6 is a schematic diagram of a structure of an apparatus according to an embodiment of this disclosure. An apparatus 600 shown in FIG. 6 may correspond to the foregoing communications apparatus, for example, the terminal device. Specifically, the apparatus 600 may be a specific example of the terminal device 120 in FIG. 1. The apparatus 600 includes a processor 602. In this embodiment of this disclosure, the processor 602 is configured to implement a corresponding control and management operation. For example, the processor 602 is configured to support the communications apparatus in performing the method, operation, or function shown in FIG. 3 or FIG. 4 in the foregoing embodiments. Optionally, the apparatus 600 may further include a memory 601 and a communications interface 603. The processor 602, the communications interface 603, and the memory 601 may be connected to each other, or may be connected to each other through a bus 604. The communications interface 603 is configured to support the communications apparatus in performing communication, and the memory 601 is configured to store program code and data of the communications apparatus. The processor 602 invokes the code or data stored in the memory 601, to implement a corresponding operation. The memory 601 may be coupled to or not coupled to the processor. The coupling in this embodiment of this disclosure is indirect coupling or a communication connection between apparatuses, units, or modules for information exchange between the apparatuses, the units, or the modules, and may be in electrical, mechanical, or other forms.

The processor 602 may be a central processing unit, a general purpose processor, a digital signal processor, an application-specific integrated circuit, a field programmable gate array or another programmable logic device, a transistor logic device, a hardware component, or any combination thereof. The processor 602 may implement or execute various example logical blocks, modules, and circuits described with reference to content disclosed in this disclosure. Alternatively, the processor may be a combination of processors implementing a computing function, for example, a combination of one or more microprocessors or a combination of a digital signal processor and a microprocessor. The communications interface 603 may be a transceiver, a circuit, a bus, a module, or another type of communications interface. The bus 604 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 6, but this does not mean that there is only one bus or only one type of bus.

An embodiment of this disclosure further provides a communications system, including a network device and the foregoing terminal device.

An embodiment of this disclosure further provides a computer program storage medium. The computer program storage medium has program instructions. When the program instructions are executed by a processor, the processor is enabled to perform the foregoing handover method.

An embodiment of this disclosure further provides a chip system. The chip system includes at least one processor, and when program instructions are executed in the at least one processor, the at least one processor is enabled to perform the foregoing handover method.

A person of ordinary skill in the art may be aware that, in combination with the examples described in the embodiments disclosed in this specification, units and algorithm steps can be implemented by electronic hardware or a combination of computer software and electronic hardware. Whether the functions are performed by using hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by the person skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed system, apparatus, and method may be implemented in another manner. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

Units described as separate parts may or may not be physically separate, and parts displayed as units may or may not be physical units, may be located at one position, or may be distributed on a plurality of network units. Some or all of the units may be selected depending on actual requirements to achieve the objectives of the solutions in the embodiments.

In addition, functional units in the embodiments of this disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely illustrative of exemplary implementations of this disclosure, but are not intended to limit the protection scope of this disclosure. Any variation or replacement readily determined by a person skilled in the art within the technical scope disclosed in this disclosure shall fall within the protection scope of this disclosure. Therefore, the protection scope of this disclosure determined by the protection scope of the claims.

What is claimed is:

1. A handover method performed by a terminal device, the method comprising:
    determining a first target cell in a network based on first conditional handover (CHO) configuration information, the first target cell being a cell to which the terminal device is to be handed over;
    starts a process of attempting to access the determined first target cell;
    receiving second CHO configuration information while in the process of attempting to access the determined first target cell; and
    determining, based on the second CHO configuration information, whether to continue to be handed over to the first target cell, wherein the process of attempting to access the determined first target cell comprises:
        a process that is initiated prior to sending a preamble to the first target cell; and/or
        a process of performing random access to the first target cell.

2. The handover method according to claim 1, wherein the determining, based on the second CHO configuration information, whether to continue to be handed over to the first target cell comprises:
    determining, based on the second CHO configuration information, whether a CHO configuration parameter included in the second CHO and corresponding to the first target cell does not change, and determining to continue to be handed over to the first target cell after determining that the CHO configuration parameter does not change.

3. The handover method according to claim 1, wherein, when handover to the first target cell is not completed, the method further comprises:
   determining, based on the second CHO configuration information alone or in combination with the first CHO configuration information, a second target cell to which the terminal device is to be handed over.

4. The handover method according to claim 1, wherein the determining, based on the second CHO configuration information, whether to continue to be handed over to the first target cell comprises:
   determining, based on the second CHO configuration information, that a CHO configuration parameter included in the second CHO configuration information and corresponding to the first target cell changes; and
   determining, based on the second CHO configuration information alone or in combination with the first CHO configuration information, a third target cell to which the terminal device is to be handed over.

5. The handover method according to claim 1, wherein the first CHO configuration information and/or the second CHO configuration information is carried in a radio resource control (RRC) message.

6. The method according to claim 1, wherein the second CHO configuration information is used to change, based on the first CHO configuration information, the first target cell configured by using the first CHO configuration information.

7. The method according to claim 1, wherein, based on the first CHO configuration information, the second CHO configuration information is used to modify a configuration parameter of the first target cell configured using the first CHO configuration information, and/or to remove the first target cell configured using the first CHO configuration information.

8. The method according to claim 7, wherein the configuration parameter of the first target cell includes: a CHO trigger condition corresponding to the first target cell, a cell radio network temporary identifier (C-RNTI) allocated by the first target cell to the terminal device, a random access channel (RACH) resource required for accessing the first target cell, and/or resource information corresponding to the first target cell.

9. A communications apparatus, comprising:
   a processor;
   a memory coupled to the processor, the memory comprising instructions that, when executed by the processor, cause the communications apparatus to:
   determine a first target cell based on first conditional handover (CHO) configuration information, the first target cell being a cell to which a terminal device is to be handed over; and
   in a process of attempting to access the determined first target cell, when receiving second CHO configuration information, determine, based on the second CHO configuration information, whether to continue to be handed over to the first target cell, wherein the process of attempting to access the determined first target cell comprises:
   a process that is initiated prior to sending a preamble to the first target cell; and/or
   a process of performing random access to the first target cell.

10. The communications apparatus according to claim 9, wherein the determining, based on the second CHO configuration information, whether to continue to be handed over to the first target cell comprises:
    determining, based on the second CHO configuration information, whether a CHO configuration parameter included in the second CHO and corresponding to the first target cell does not change, and
    determining to continue to be handed over to the first target cell after determining the CHO configuration parameter does not change.

11. The communications apparatus according to claim 9, wherein when handover to the first target cell is not completed, the instructions, when executed by the processor, further cause the communications apparatus to:
    determine, based on the second CHO configuration information alone or in combination with the first CHO configuration information, a second target cell to which the terminal device is to be handed over.

12. The communications apparatus according to claim 9, wherein the determining, based on the second CHO configuration information, whether to continue to be handed over to the first target cell comprises:
    determining that a configuration parameter included in the second CHO and corresponding to the first target cell has changed; and
    determining, based on the second CHO configuration information alone or in combination with the first CHO configuration information, a third target cell to which the terminal device is to be handed over.

13. The communications apparatus according to claim 9, wherein the first CHO configuration information and/or the second CHO configuration information is carried in a radio resource control (RRC) message.

14. A non-transitory, computer-readable medium storing computer-executable instructions that, when executed by one or more processors of a computer, cause the computer to perform operations comprising:
    determining a first target cell in a network based on first conditional handover (CHO) configuration information, the first target cell being a cell to which a terminal device is to be handed over;
    starts a process of attempting to access the first target cell;
    receiving second CHO configuration information while in the process of attempting to access the determined first target cell; and
    determining, based on the second CHO configuration information, whether to continue to be handed over to the first target cell, wherein the process of attempting to access the determined first target cell comprises:
    a process that is initiated prior to sending a preamble to the first target cell; and/or
    a process of performing random access to the first target cell.

15. The non-transitory, computer-readable medium according to claim 14, wherein the determining, based on the second CHO configuration information, whether to continue to be handed over to the first target cell comprises:
    determining, based on the second CHO configuration information, that a CHO configuration parameter included in the second CHO configuration information and corresponding to the first target cell does not change; and
    determining to continue to be handed over to the first target cell.

16. The non-transitory, computer-readable medium according to claim 14 wherein, when terminal device handover to the first target cell is not completed, the operations further comprise:
  determining, based on the second CHO configuration information alone or in combination with the first CHO configuration information, a second target cell to which the terminal device is to be handed over.

17. The non-transitory, computer-readable medium according to claim 14, wherein the determining, based on the second CHO configuration information, whether to continue to be handed over to the first target cell comprises:
  determining, based on the second CHO configuration information, that a CHO configuration parameter included in the second CHO and corresponding to the first target cell changes; and
  determining, based on the second CHO configuration information alone or in combination with the first CHO configuration information, a third target cell to which the terminal device is to be handed over.

18. The non-transitory, computer-readable medium according to claim 11, wherein the first CHO configuration information and/or the second CHO configuration information is carried in a radio resource control (RRC) message.

* * * * *

UNITED STATES PATENT AND TRADEMARK OFFICE
CERTIFICATE OF CORRECTION

Page 1 of 1

PATENT NO. : 12,160,728 B2
APPLICATION NO. : 17/667405
DATED : December 3, 2024
INVENTOR(S) : Le Yan et al.

It is certified that error appears in the above-identified patent and that said Letters Patent is hereby corrected as shown below:

In the Claims

Column 48, Claim 1, Lines 41-42 change "the method comprising" to --comprising--.

Signed and Sealed this
Seventh Day of January, 2025

Derrick Brent
*Acting Director of the United States Patent and Trademark Office*